(12) United States Patent
Castro

(10) Patent No.: US 12,551,355 B2
(45) Date of Patent: Feb. 17, 2026

(54) THREADLESS SPINAL IMPLANT

(71) Applicant: Blue Sky Technologies, LLC, Louisville, KY (US)

(72) Inventor: Frank Castro, Louisville, KY (US)

(73) Assignee: BLUE SKY TECHNOLOGIES, LLC, Louisville, KY (US)

( * ) Notice: Subject to any disclaimer, the term of this patent is extended or adjusted under 35 U.S.C. 154(b) by 121 days.

(21) Appl. No.: 18/612,008

(22) Filed: Mar. 21, 2024

(65) Prior Publication Data

US 2024/0225856 A1    Jul. 11, 2024

Related U.S. Application Data

(63) Continuation-in-part of application No. 18/088,534, filed on Dec. 24, 2022, now abandoned.

(60) Provisional application No. 63/317,041, filed on Mar. 6, 2022, provisional application No. 63/310,189, filed on Feb. 15, 2022.

(51) Int. Cl.
| | |
|---|---|
| *A61F 2/46* | (2006.01) |
| *A61F 2/30* | (2006.01) |
| *A61F 2/44* | (2006.01) |

(52) U.S. Cl.
CPC ............ *A61F 2/4611* (2013.01); *A61F 2/446* (2013.01); *A61F 2002/30507* (2013.01)

(58) Field of Classification Search
CPC ...... A61F 2/4611; A61F 2/446; A61F 2/4405; A61F 2/441; A61F 2/442; A61F 2/4425; A61F 2/443; A61F 2/4435; A61F 2/444; A61F 2/4445; A61F 2/445; A61F 2/4455

See application file for complete search history.

(56) References Cited

U.S. PATENT DOCUMENTS

| | | |
|---|---|---|
| 7,993,347 B1 | 8/2011 | Michelson |
| 8,012,186 B2 | 9/2011 | Pham et al. |
| 8,523,910 B2 * | 9/2013 | Seifert ............... A61B 17/7062 606/248 |
| 8,764,804 B2 | 7/2014 | Rezach |
| 8,808,377 B2 * | 8/2014 | Donner ................. A61F 2/4455 623/17.11 |
| 9,101,409 B2 * | 8/2015 | Nishida .............. A61B 17/7062 |
| 9,788,961 B2 * | 10/2017 | Donner ............. A61B 17/7055 |
| 9,826,986 B2 | 11/2017 | Donner et al. |
| 10,166,033 B2 | 1/2019 | Reiley et al. |
| 10,413,332 B2 | 9/2019 | Schumacher et al. |
| 2006/0036251 A1 | 2/2006 | Reiley |
| 2007/0050028 A1 * | 3/2007 | Conner ................ A61F 2/4684 623/17.11 |
| 2009/0275989 A1 | 11/2009 | Linares |
| 2009/0312763 A1 | 12/2009 | McCormack et al. |
| 2010/0100135 A1 | 4/2010 | Phan |
| 2011/0098747 A1 | 4/2011 | Donner et al. |
| 2013/0053891 A1 * | 2/2013 | Hawkins ............... A61F 2/4611 606/264 |
| 2015/0134016 A1 | 5/2015 | Biedermann et al. |

(Continued)

FOREIGN PATENT DOCUMENTS

WO    WO-2012028920 A2 *    3/2012    ............ A61F 2/4611

*Primary Examiner* — Eduardo C Robert
*Assistant Examiner* — Holly Joanna Lane
(74) *Attorney, Agent, or Firm* — BUSINESS PATENT LAW, PLLC

(57) ABSTRACT

A threadless spinal implant suited for implantation or use in a mammalian spinal or other boney tissue.

20 Claims, 28 Drawing Sheets

(56) References Cited

U.S. PATENT DOCUMENTS

| | | |
|---|---|---|
| 2015/0250518 A1 | 9/2015 | Chirico et al. |
| 2019/0142601 A1* | 5/2019 | Ashleigh ............ A61F 2/30749 623/17.16 |
| 2020/0268525 A1 | 8/2020 | Mesiwala et al. |
| 2021/0307924 A1 | 10/2021 | Glerum et al. |

* cited by examiner

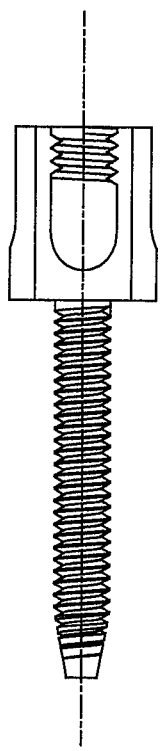
*Prior Art*
*Fig 17*
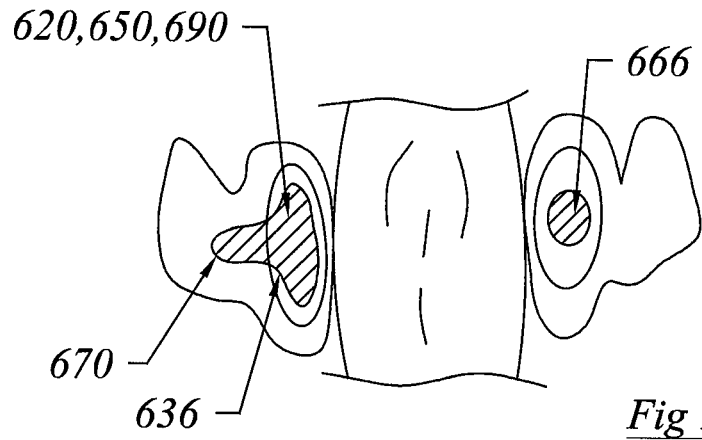
*Fig 18a*
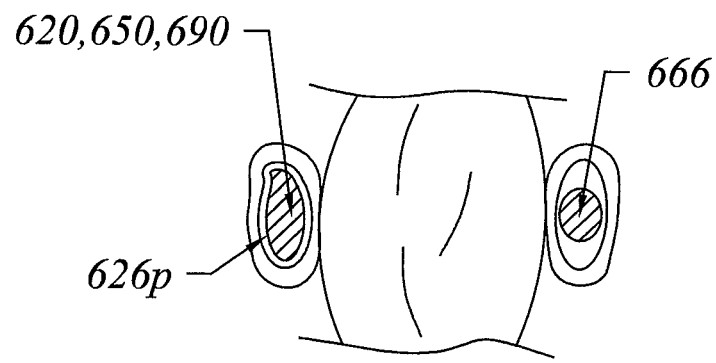
*Fig 18b*
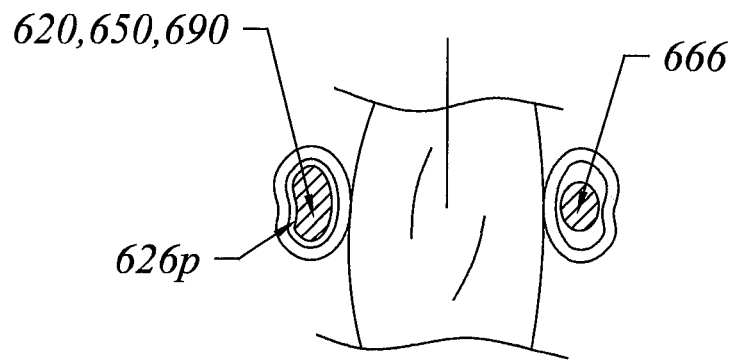

THREADLESS SPINAL IMPLANT

PRIORITY

Applicant claims priority to application Ser. No. 18/088,534—Threadless Friction Fit Surgical Implant—, Filed Dec. 24, 2022, Castro, F., That Claims The Benefit Of U.S. Provisional Application No. 63/310,189—Friction Fit Surgical Implant—, Filed Feb. 15, 2022 And US Provisional Application 63/317,041—Process of Making a Personalized Implant for a Patient—Filed Mar. 6, 2022.

BACKGROUND OF THE INVENTION

A. Field of the Invention

Among other things, the present invention is a threadless friction fit surgical implant or spinal implant. The current implant is particularly suited for implantation or use in mammalian spinal or other boney tissues. Embodiments of the current invention can include rough surfaces in anticipation of improving attachment of bone to the threadless friction fit surgical implant or spinal implant.

B. Description of the Previous Art

Any discussion of references cited in this Description of the Previous Art merely summarizes the disclosures of the cited references and Applicant makes no admission that any cited reference or portion thereof is relevant prior art. Applicant reserves the right to challenge the accuracy, relevancy and veracity of the cited references.

References that may indicate a state-of-the-art for the current invention include: 1) U.S. Pat. No. 7,993,347—Michlelson discloses a guard for use in performing human interbody surgery; 2) US Published Patent Application 20090312763—McCormack et al. discloses facet joint implants and delivery tools; 3) U.S. Pat. No. 8,012,186—Pham et al. discloses a uniplanar screw; 4) U.S. Pat. No. 8,764,804—Rezach discloses a bone fastener and methods of use; 5) U.S. Pat. No. 9,826,986—Donner et al. discloses systems for and methods of preparing a sacroiliac joint for fusion; 6) US Published Patent Application 20150250518—Chirico et al. discloses implantable devices and methods for treating micro-architecture deterioration of bone tissue; 7) US Published Patent Application 20100100135A1—Phan discloses a bone fixation device having an expandable anchor; 8) U.S. Pat. No. 10,166,033B2—Reiley et al discloses implants for bone fixation or fusion; 9) US Published Patent Application 20110098747A1—Donner et al discloses an arcuate fixation member; 10) US Published Patent Application 20210307924A1—Glerum et al discloses pedicle-based intradiscal fixation devices and methods; 11) US Published Patent Application 20150134016A1—Biedermann et al discloses bone anchor and bone anchoring assembly comprising the same; 12) US Published Patent Application 20090275989A1—Linares discloses composite and surface mounted brace, kit and assembly for supporting a fractured bone; 13) US Published Patent Application 20200268525A1—Mesiwala et al discloses implants for spinal fixation or fusion; 14) US Published Patent Application 20060036251A1—Reiley discloses systems and methods for the fixation or fusion of bone; 15) U.S. Pat. No. 10,413,332B2—Schumacher et al discloses joint fusion implant and methods.

SUMMARY OF THE INVENTION

In the most general sense, the present invention is a threadless friction fit surgical implant for augmenting the strength of a boney segment. Strength augmentation is achieved by replacing the cancellous bone within a boney segment with a form fitting porous ingrowth implant. Immediate stabilization of the implant is achieved by frictional pressure. Long-term stabilization is achieved by either bone growth into the porous surface of the implant or addition of an adhesive, such as Polymethylmethacrylate, which interdigitates the porous surface of the implant with the subcortical bone. The current invention can be adapted for use with vertebra or other bone tissues. Use of threadless surgical implants removes the risk of threads damaging nerves, blood vessels and other tissues within the surgical field. Use of threadless surgical implants also reduces the risk implant malposition as threads can inadvertently cause implant misdirection when they engage cortical bone.

An aspect of the present invention is to provide a threadless spinal implant.

Still another aspect of the present invention is to provide a threadless spinal implant including roughened or porous surfaces for bone ingrowth.

It is still another aspect of the present invention is to provide a threadless spinal implant having varied cross-sectional areas along the length of the threadless friction fit surgical implant.

Still another aspect of the present invention is to provide a threadless spinal implant including a conical or conical-like segment.

It is still another aspect of the present invention to provide a threadless spinal implant including one or more openings.

Yet still another aspect of the present invention is to provide a threadless spinal implant including a conduit.

Still another aspect of the present invention is to provide a threadless spinal implant without a conduit.

It is still another aspect of the present invention to provide a threadless spinal implant with four distinct regions.

Yet still another aspect of the present invention is to provide a threadless spinal implant with wings or bulges.

Still another aspect of the present invention is to provide a threadless spinal implant including a blunt tip.

It is still another aspect of the present invention to provide a threadless friction fit surgical implant with a first portion that is offset from a second portion of the threadless friction fit surgical implant.

Yet still another aspect of the present invention is to provide a threadless spinal implant a hole or fenestration in a wing or bulge.

Still another aspect of the present invention is to provide a threadless spinal implant connectable to a device distinct from the threadless friction fit surgical implant. By way of illustration, side-loading connectors, distinct from the implant, can attach to the exterior surface of region four of the threadless spinal implant, whereas top-loading connection devices, distinct from the implant, can attach to an exterior surface or the conduit of the threadless spinal implant.

It is still another aspect of the present threadless spinal implant is to provide a threadless spinal implant including a second region with dimensions that can increase symmetrically or asymmetrical in a medial, a lateral, a superior and/or an inferior plane.

Yet still another aspect of the present threadless spinal implant is to provide an amorphous first region and the second region.

Still another aspect of the present invention is to provide a threadless implant including first and second graduated slopes.

A preferred embodiment of the current invention can be described as a threadless spinal implant comprising: a) an exterior surrounding a conduit extending through a length of the threadless spinal implant; b) a fourth region, proximate a surgeon, adapted to receive an insert distinct from the spinal implant and a first region guiding the threadless spinal implant along a predetermined surgical route into an identified anatomic location; c) a third region and a second region positioned between the fourth region and the first region; the regions being threadless and positioned about a longitudinal axis of the threadless spinal implant; the first region, the second region and the third region comprising porous or rough outer surfaces and the fourth region comprising a smoother outer surface; and d) an outward expansion of the conduit in the third region creating a lock, and one or more outward expansions of the exterior surface of the third region comprising a first graduated slope and a second graduated slope connected to and opposed from the first graduated slope; the second graduated slope inhibiting insertion of the threadless spinal implant beyond a preselected distance, wherein outward dimensions of the third region are greater than the second region and outward dimensions of the first region are less than or equal to the outward dimensions of the second region such that, on insertion, the first region creates the predetermined surgical route and the second region and the third region enlarge the surgical route until the second graduated slope inhibits further insertion of the threadless spinal implant into the identified anatomic location.

Another preferred embodiment of the current invention can be described as a threadless spinal implant comprising: a) an exterior surrounding a conduit extending through a length of the threadless spinal implant; b) a fourth region, proximate a surgeon, adapted to receive an insert distinct from the spinal implant and a first region guiding the threadless spinal implant along a predetermined surgical route into an identified anatomic location; c) a third region and a second region positioned between the fourth region and the first region; the regions being threadless and positioned about a longitudinal axis of the threadless spinal implant; the first region, the second region and the third region comprising porous or rough outer surfaces and the fourth region comprising a smoother outer surface; and d) one or more outward expansions of the exterior surface of the third region, comprising a first graduated slope and a second graduated slope connected to and opposed from the first graduated slope; the second graduated slope inhibiting insertion of the threadless spinal implant beyond a preselected distance, wherein outward dimensions of the third region are greater than the second region and outward dimensions of the first region are less than or equal to the outward dimensions of the second region such that, on insertion, the first region creates a predetermined surgical route and the second region and the third region enlarge the surgical route until the second graduated slope inhibits further insertion of the threadless spinal implant into the identified anatomic location.

Still another preferred embodiment of the current invention can be described as a threadless spinal implant for implantation into a surgical field; the threadless spinal implant comprising: a) a longitudinal axis extending through the spinal implant and a conduit centered about the longitudinal axis (X-X); the conduit extending through an entire length of the spinal implant; b) an exterior, surrounding the conduit, comprising: i) a fourth region proximate a surgeon; ii) a first region guiding the threadless spinal implant along a predetermined surgical route into an identified anatomic location; iii) a third region and a second region positioned between the fourth region and the first region; the regions being threadless; the first region, the second region and the third region comprising porous or rough outer surfaces and the fourth region comprising a smoother outer surface; and c) one or more outward expansions, outward from the longitudinal axis, of the third region, comprising a first graduated slope and a second graduated slope connected to and opposed from the first graduated slope; the second graduated slope inhibiting insertion of the threadless spinal implant beyond a preselected distance, wherein, on insertion, the first region follows a predetermined surgical route into the surgical field creating a surgical cavity and the second region and third region enlarge the surgical cavity.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

BRIEF DESCRIPTION OF THE DRAWINGS

FIG. 17 is a perspective of a prior art threaded pedicle screw.

FIGS. 18*a-c* portray coronal slice views of pedicles with preferred embodiments of the current implant implanted into the pedicles. Left side views are of preferred embodiments of the threadless implant. Right side views of FIGS. 18*a-c* portray traditional threaded pedicle screws implanted into the pedicles.

DESCRIPTION OF THE PREFERRED EMBODIMENTS

Figure 1:
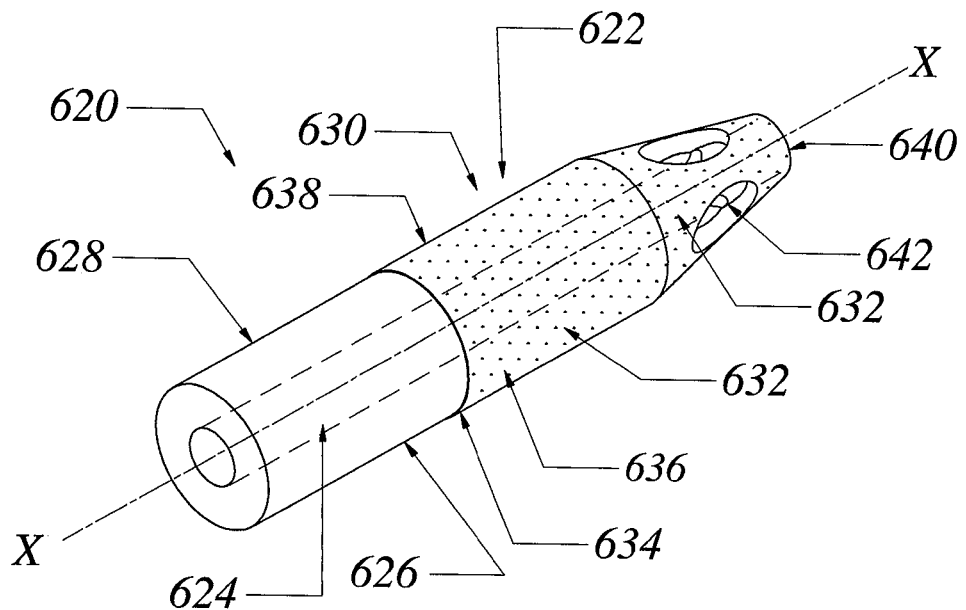
FIG. 1 is a perspective of a first preferred embodiment of the current implant.
Figure 2:
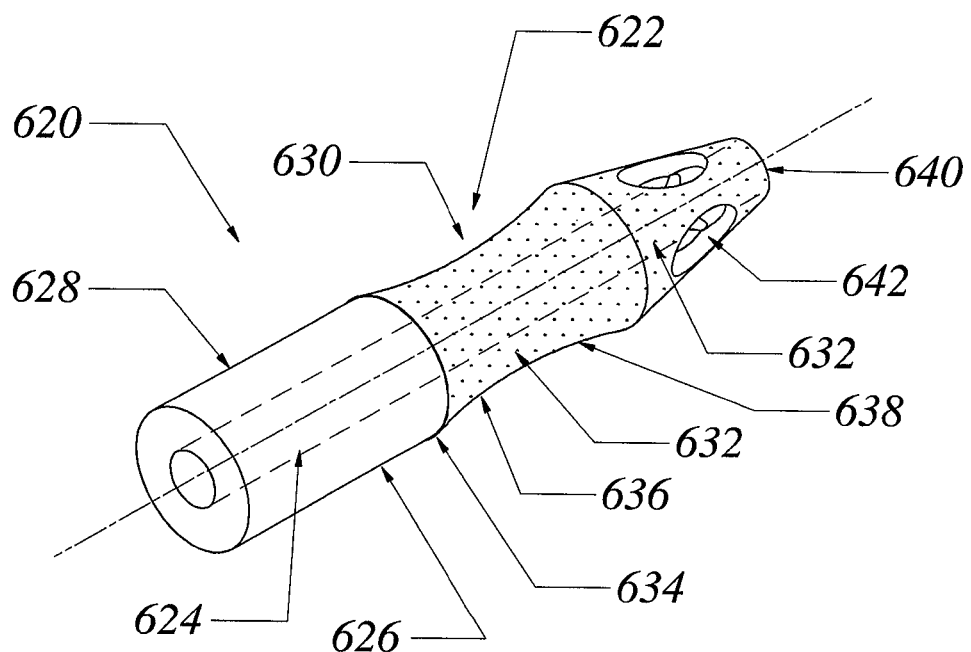
FIG. 2 is a perspective of a first preferred embodiment of the current implant.
Figure 1A:
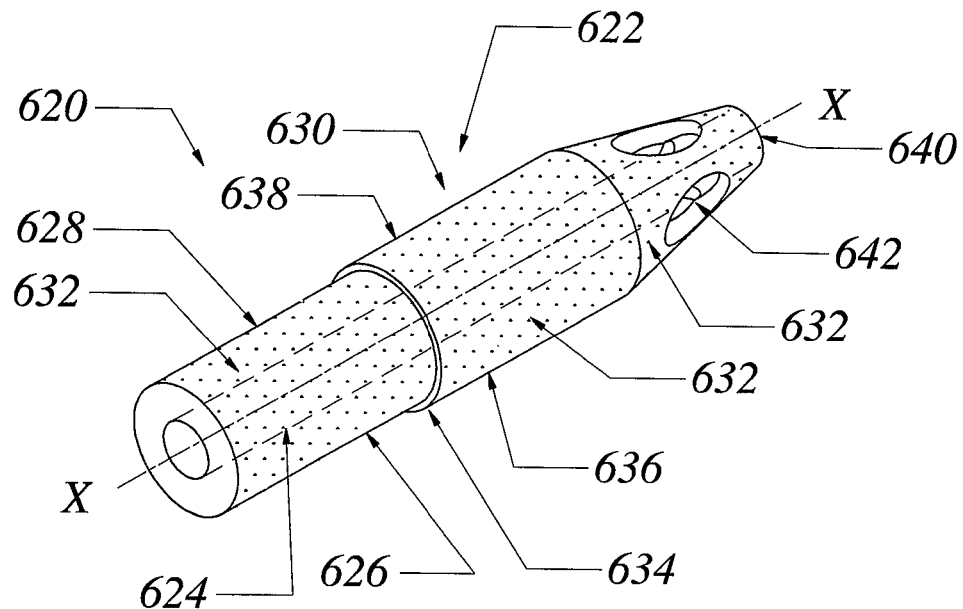
FIG. 1a is a perspective of a first preferred embodiment of the current implant.
Figure 2A:
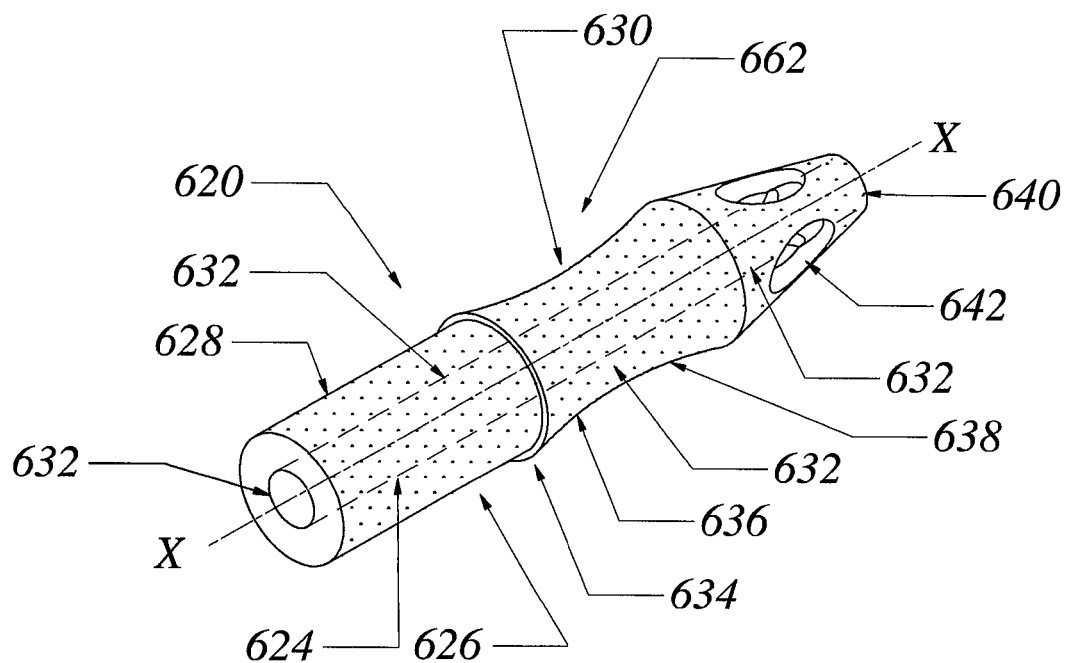
FIG. 2a is a perspective of a first preferred embodiment of the current implant.
Figure 3:
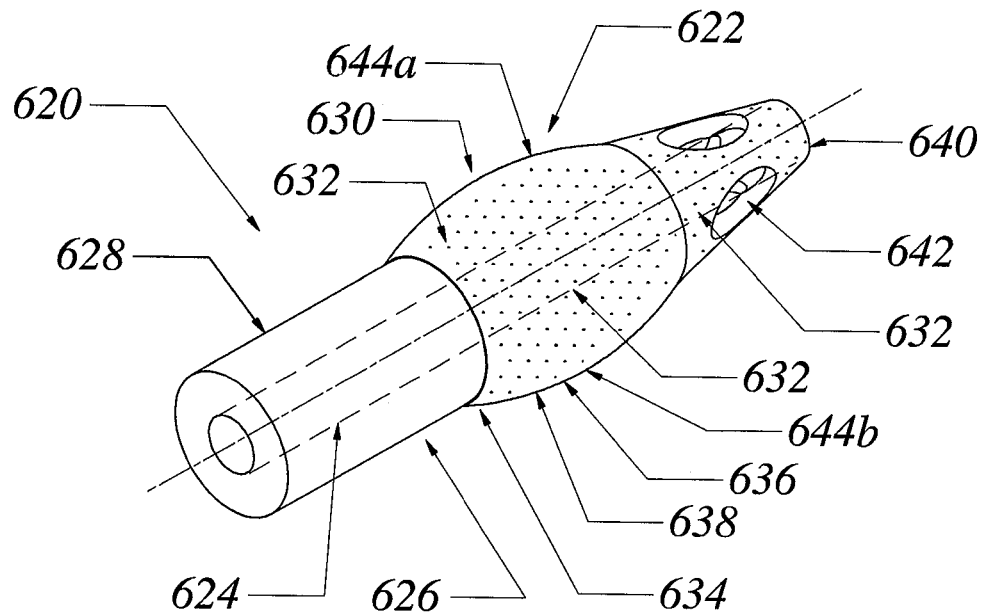
FIG. 3 is a perspective of a second preferred embodiment of the current implant.
Figure 4:
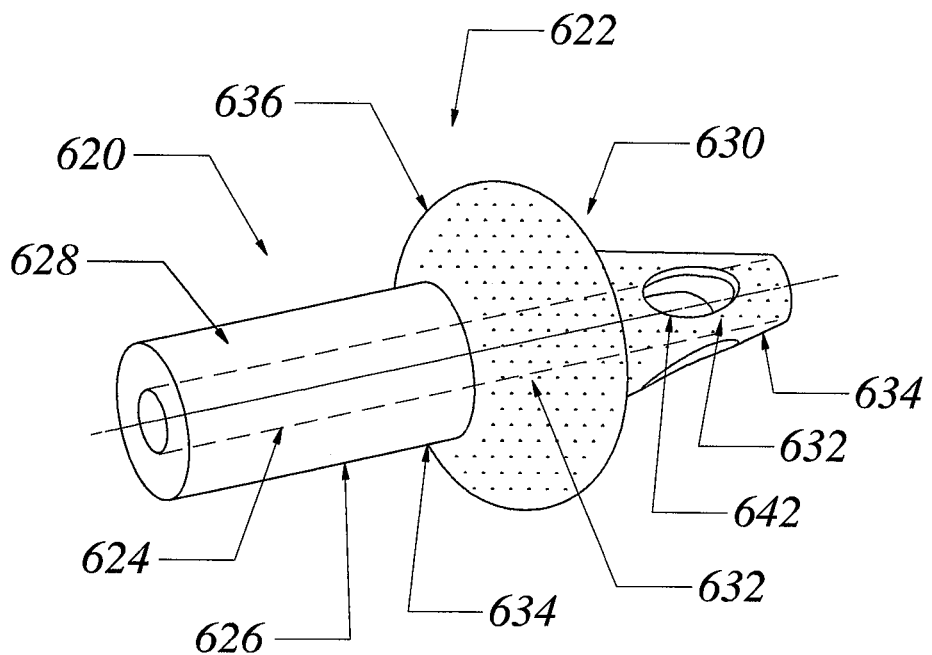
FIG. 4 is a perspective of a second preferred embodiment of the current implant.
Figure 3A:
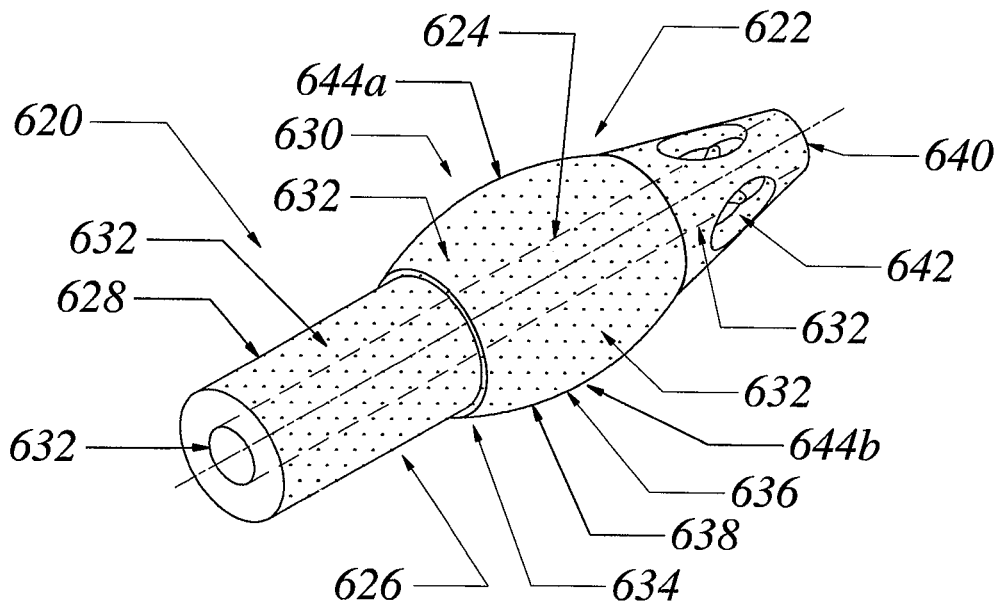
FIG. 3a is a perspective of a second preferred embodiment of the current implant.
Figure 4A:
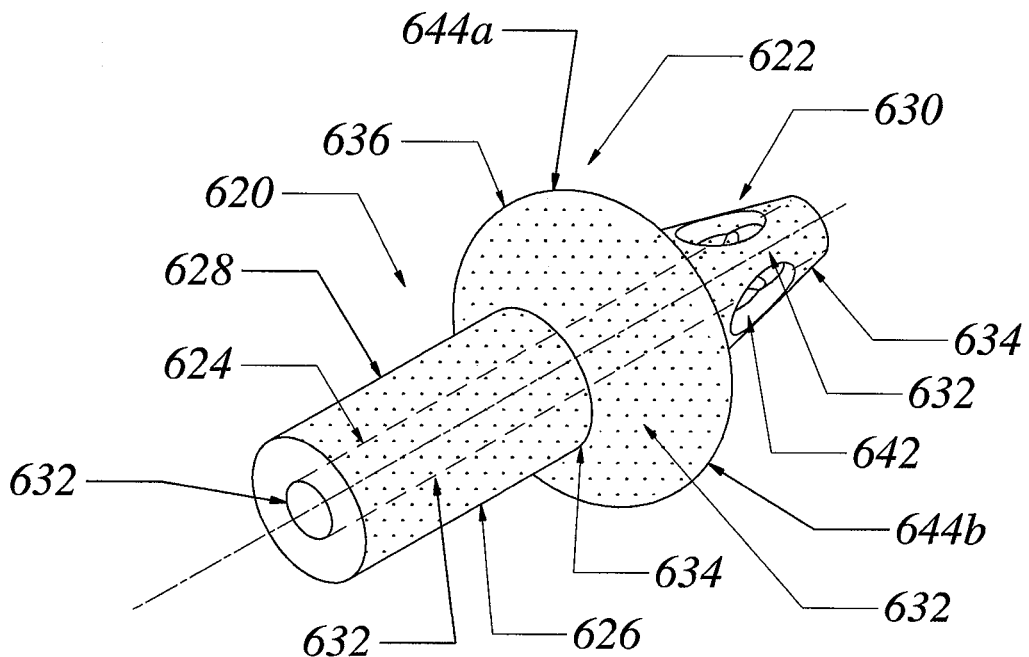
FIG. 4a is a perspective of a second preferred embodiment of the current implant.
Figure 5:
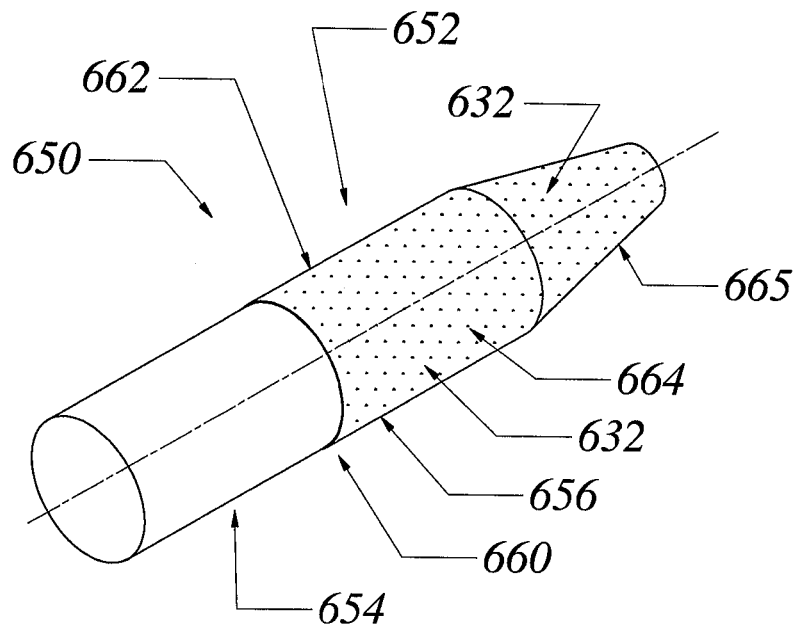
FIG. 5 is a perspective of a third preferred embodiment of the current implant.
Figure 6:
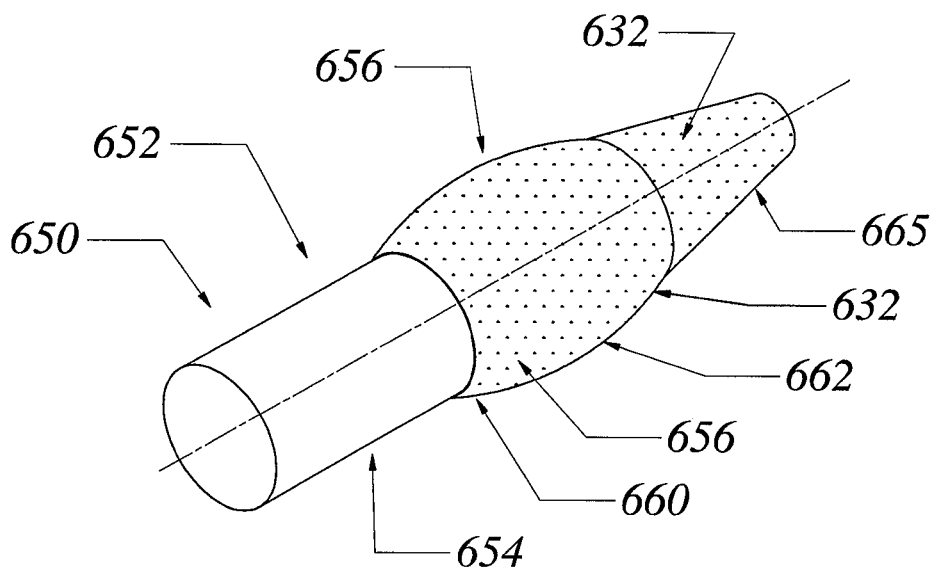
FIG. 6 is a perspective of a third preferred embodiment of the current implant.
Figure 5A:
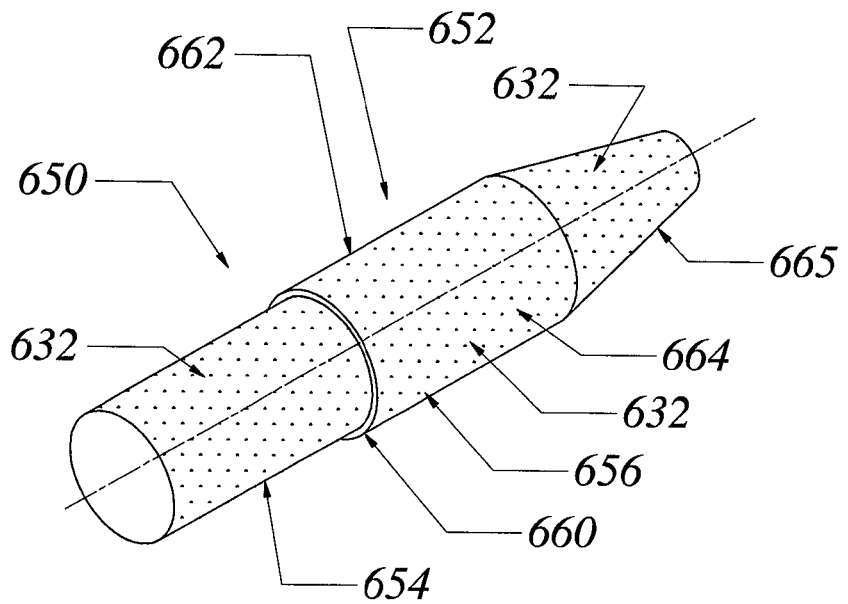
FIG. 5a is a perspective of a third preferred embodiment of the current implant.
Figure 6A:
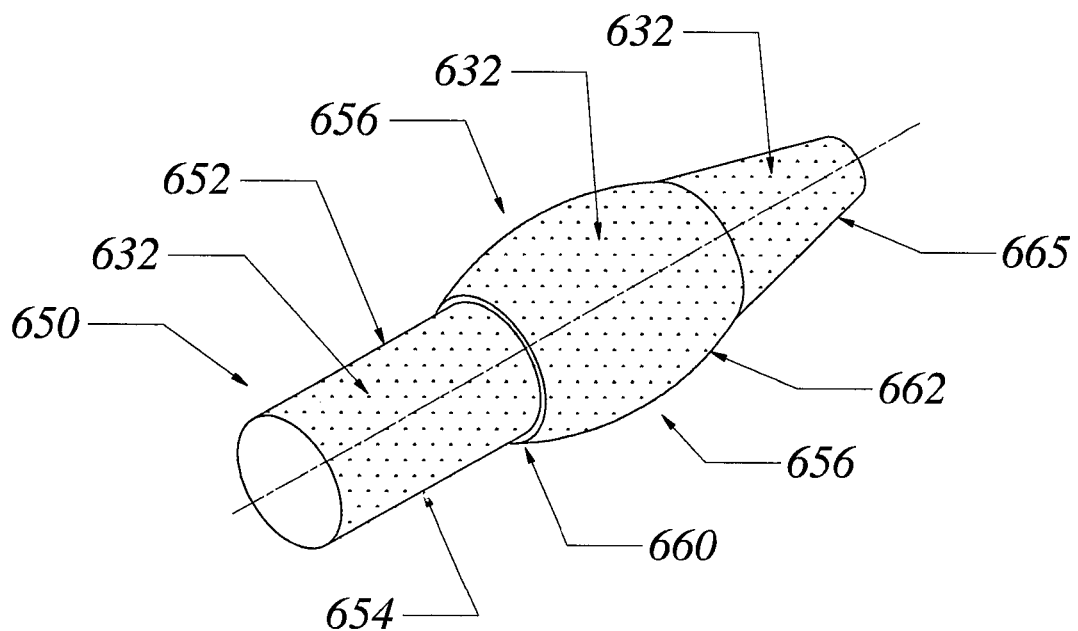
FIG. 6a is a perspective of a third preferred embodiment of the current implant.
Figure 7:
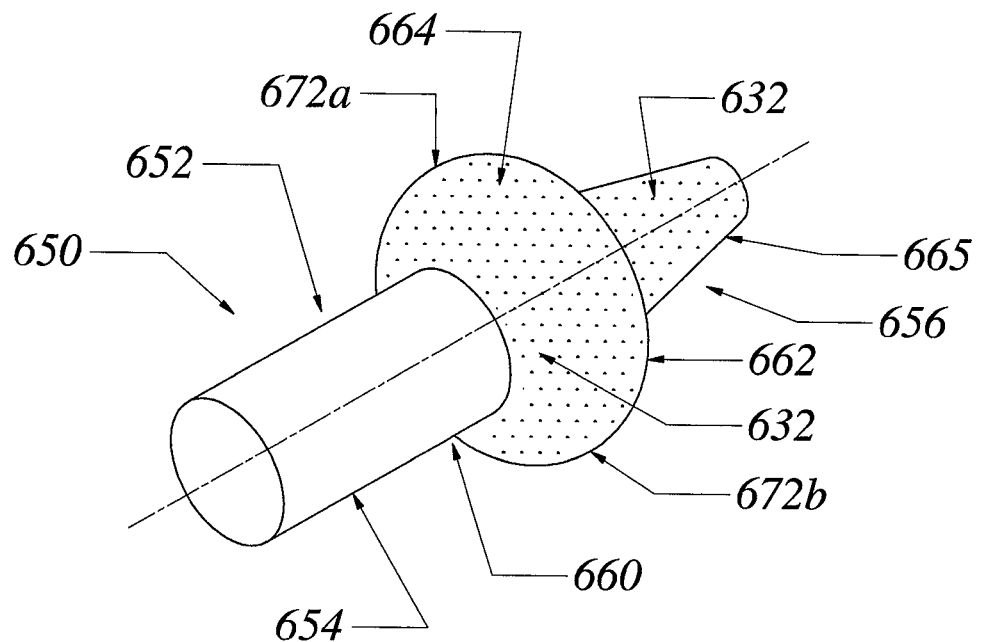
FIG. 7 is a perspective of a fourth preferred embodiment of the current implant.
Figure 8:
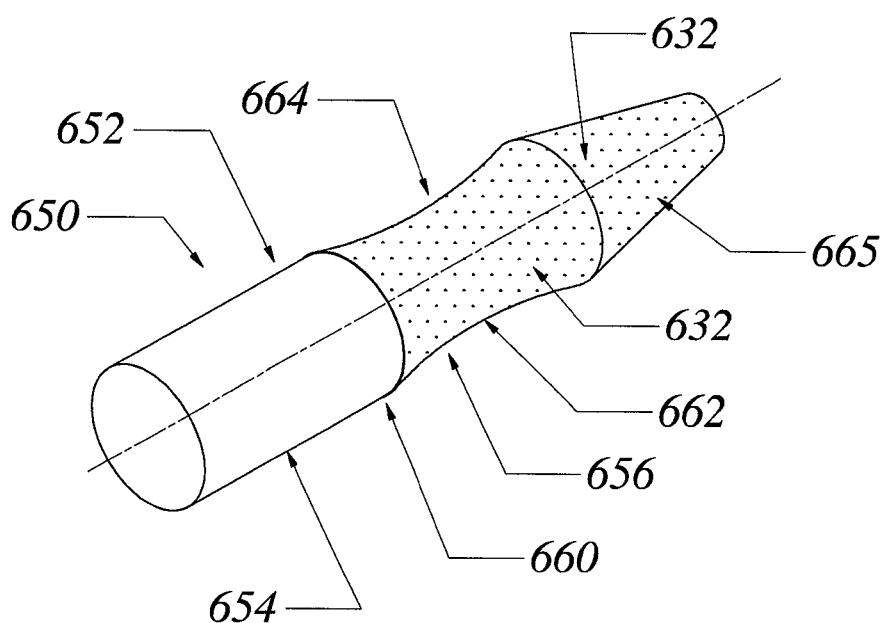
FIG. 8 is a perspective of a fourth preferred embodiment of the current implant.
Figure 7A:
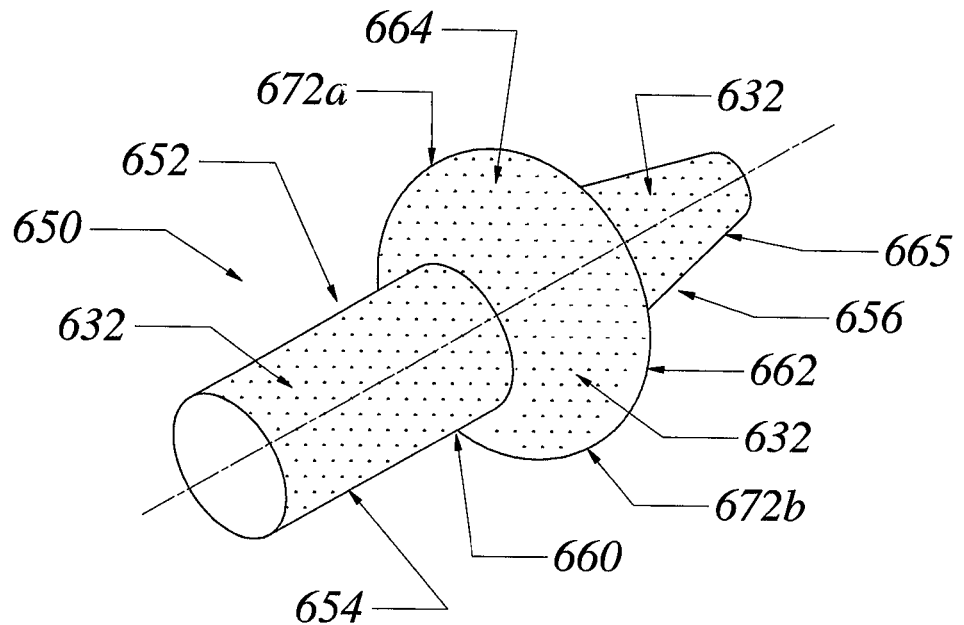
FIG. 7a is a perspective of a fourth preferred embodiment of the current implant.
Figure 8A:
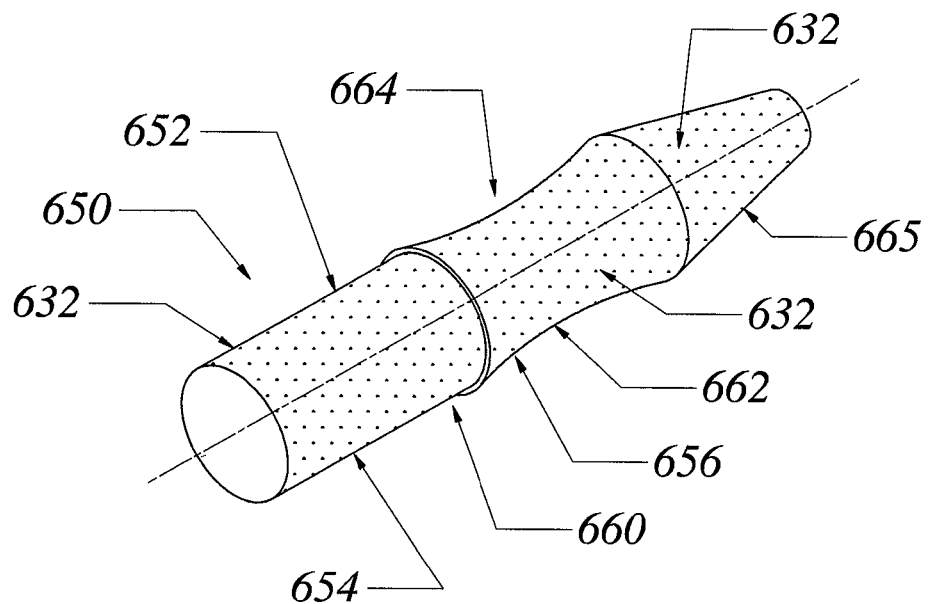
FIG. 8a is a perspective of a fourth preferred embodiment of the current implant.

Although the disclosure hereof is detailed to enable those skilled in the art to practice the invention, the embodiments published herein merely exemplify the present invention.

In the most general sense, the present invention is a threadless friction fit surgical implant or spinal implant that can be implanted between two boney segments. The surgical implant or spinal implant is threadless. Immediate stabilization of the threadless friction fit surgical implant is achieved by compressive and frictional forces. Compressive forces holding the implant in the desired location are created by placing a slightly oversized implant into the surgically created cavity. Frictional pressures are created by interdigitation of the roughened implant surface with the subcortical bone. Long-term stabilization is achieved by bone growth into the roughened or porous surfaces of the implant. Immediate and long-term stabilization of the implant can be achieved when an adhesive, such as polymethylmethacrylate, is placed in between the implant and the subcortical bone. The current invention can be adapted for use with vertebra or other bone tissues.

The present threadless friction fit surgical implant is particularly adapted for use in the thoracic and lumbar regions of the spine. Meeting a long felt but unfilled need in the orthopaedic surgical arts, the novel and unique structures of the present spinal implant allow the surgical team to utilize a threadless implants for select surgical procedures.

Threaded implants cut through weak bone both during and after implantation damaging nerves, blood vessels and other tissues. Threaded implants may also be improperly positioned when thread engagement redirects the trajectory of the traditional screw. Malposition of an implant may weaken the stability of a construct and result in additional tissue damage.

Preferred embodiments of the present invention are manufactured of titanium alloys, stainless steel, non-resorbable polymers or any other composition acceptable in the art. Embodiments can be manufactured using additive techniques, subtractive techniques or a combination thereof.

By way of illustration, additive techniques, such as 3D printing, involve building the device out of microscopic metal particles. The device can be built particle by particle over the length of the device. Particles can be fused together to maximize density and create smooth (external) surfaces. It is believed that densely fused particles improve a 3D printed implant's biomechanical strength. Densely fused particles can also provide the 3D printed implant a smooth surface over which connectors and other devices can be attached. Densely fused particles can also provide the 3D printed implant a smooth inner surface, such as a conduit with a locking mechanism to which connectors and other devices can be inserted. In contrast, particles fused together in clumps can create a rough or a porous texture. Rough or porous surfaces can facilitate ingrowth of bone at the expense of implant strength. In select preferred embodiments, rough surfaces can be included with a conduit of the current implant. Bone ingrowth within the implant can increase the implant's biomechanical strength, facilitate load transfers over a greater surface area, and allow living bone or other tissues to grow into available spaces.

Increasing the surface contact area between the host bone and threadless implant improves implant stabilization via frictional forces. Immediate implant stabilization optimizes the probability of bone growth into the porous surfaces of the implant. Bone growth into the porous surface increases the surface contact area between the implant and host bone and increases the probability of long-term implant stability. When the frictional forces and surface contact area between the host bone and threadless implant are suboptimal, the probability of bone growth into the porous surface and long-term stability of the implant are can be compromised. Surgeons often use adhesives, such as polymethylmethacrylate, to accelerate the long-term stability of the implant. Stable threadless implants connected to other stable threadless implants at different locations create stable constructs. In spine surgery, stable constructs have stronger biomechanical strength, facilitate load transfers over a greater surface area and can reduce the need for revision surgery due to complications associated with implant loosening.

Subtractive manufacturing methods start with a solid block of metal or other composition acceptable in the art that is larger in height, width and length than the end-embodiment's size. Subtractive manufacturing removes portions of the block to create the preselected dimensions of the implant. Abrasive particles, lasers and/or chemical treatments can be used to roughen the surface of the implant. During a subtractive manufacturing process of the implant, its total size decreases.

Certain implants can be created by the combination of subtractive and additive manufacturing techniques where an additive rough surface is added to the implant initially created by subtractive manufacturing. For example, some standard sized press-fit total hip and press-fit total knee implants are manufactured with the combination of subtractive and additive manufacturing techniques.

It is believed that rough surfaces assist with long term fixation of the implant by allowing more bone ingrowth onto and/or into the implant. Within the scope of the current threadless friction fit surgical implant or spinal implant, either additive or subtractive means or a combination thereof can create the rough surfaces for any exposed surface of the threadless friction fit surgical implant or spinal implant. For the purposes of this Application, "rough surfaces" are defined as, "biocompatible surfaces created by additive and/or subtractive means on any surface of the implant that can facilitate ingrowth or interdigitation of the host tissues with the implant."

Within the scope of the present invention, threadless friction fit surgical implants or spinal implants (620, 650, 690) can have lengths from about 20 to about 75 millimeters and diameters from about 4 to about 25 millimeters. Fourth region (646) has lengths from about 5 millimeters to about 20 millimeters to accommodate side-loading or top-loading, devices distinct from threadless surgical or spinal implants (620, 650, 690), such as polyaxial head (100).

FIGS. 1-4a are lateral perspectives of threadless friction fit surgical implant (620).

In a preferred embodiment, threadless friction fit surgical implant (620) is provided with cannula (622). Cannula (622) includes conduit (624) adapted to carry one or more biocompatible substances. Conduit (624) traverses an entire length of a longitudinal axis of cannula (622).

Barrier (626) surrounds conduit (624). Barrier (626) can be provided with a first cylindrical section (628) with layers of rough surfaces (632) and a second section (630), adjacent to the first cylindrical section (628), with more layers of rough surfaces (632) than the first cylindrical section (628). First cylindrical section (628) includes a first diameter (634) merged with the second section (630). Second section (630) includes first segment (636) proximate the first cylindrical section (628). A portion of a cross-sectional diameter (638) of the first segment (636) is less than, equal to or greater than the first diameter (634). Second segment (640) is merged and connected with the first segment (636). Second segment (640) is interrupted by one or more openings (642) allowing interactions between conduit (624) and a surgically created environment proximate threadless friction fit surgical implant (620).

Among other things, rough surfaces (632) can include micropores, metal, abrasive particles, dense particles or clumps of particles.

When dictated by the predetermined surgical route, first segment (636) is cylindrical and second segment (640) is conical.

When dictated by the predetermined surgical route, first segment (636) is biconvex and the second segment (640) is conical. First segment (636) can be provided with a greater length than curved lengths of each opposed convex sides (644a, 644b). First segment (636) can also be ovoid.

When dictated by the predetermined surgical route, first segment (636) is biconcave and second segment (640) is conical.

Figure 11:
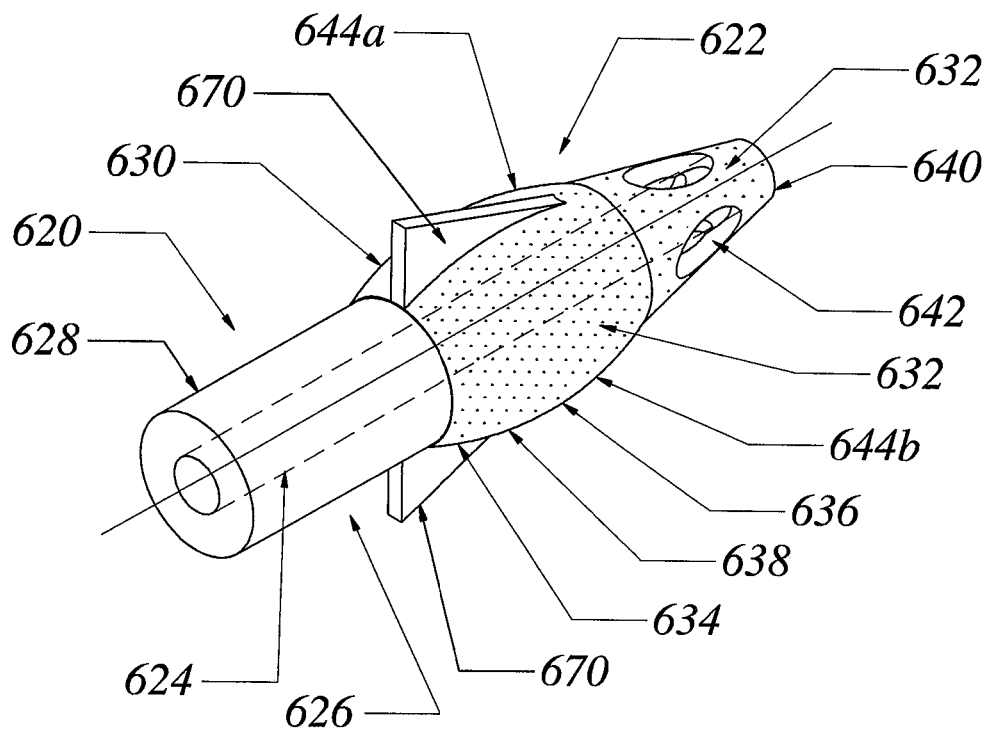
FIG. 11 is a perspective of a fifth preferred embodiment of the current implant.
Figure 12:
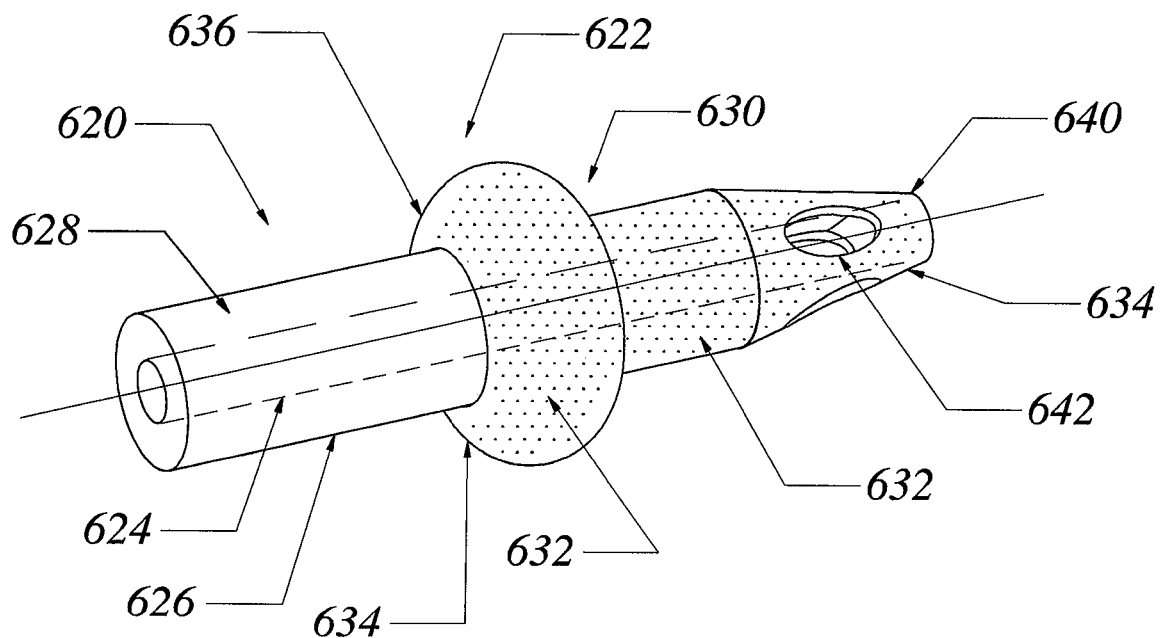
FIG. 12 is a perspective of a sixth preferred embodiment of the current implant.

As shown in FIG. 11, when dictated by the surgically created cavity, threadless friction fit surgical implant (620) can be provided with wings, bulges or outward expansions (670).

Figure 9:
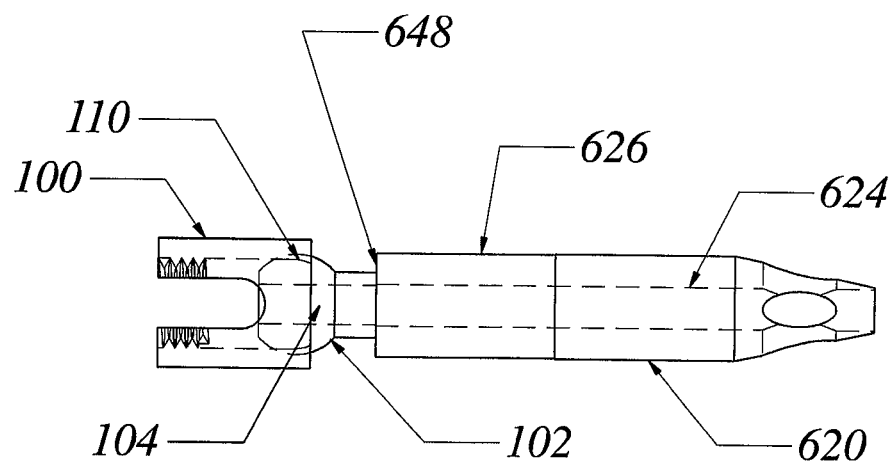
FIG. 9 is a lateral view of the current implant including a conduit and an attachable polyaxial head.
Figure 15:
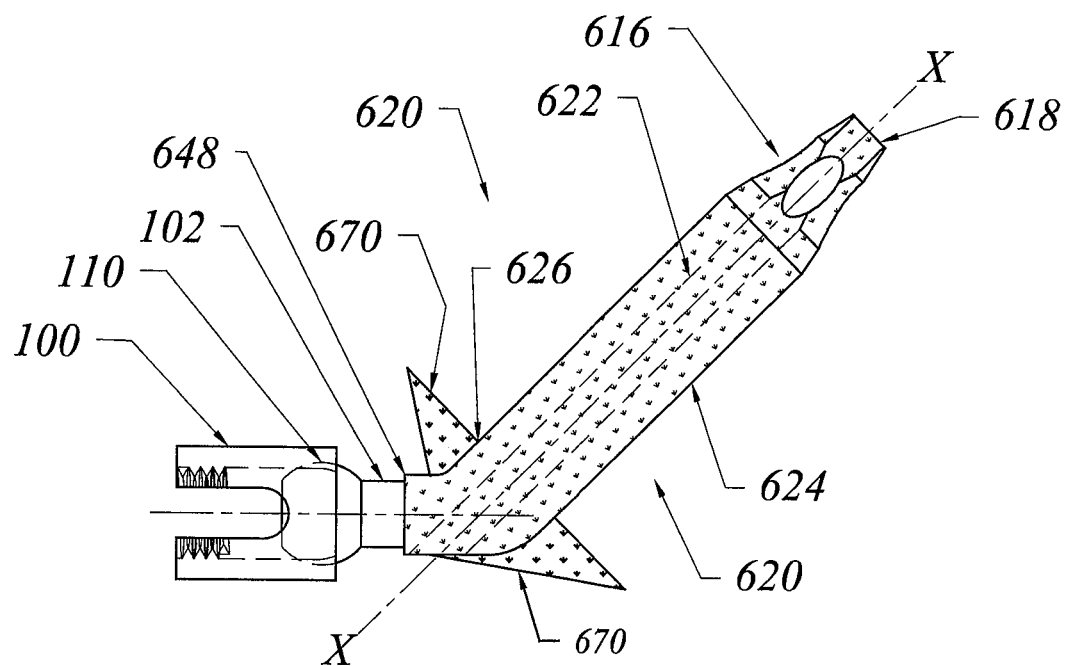
FIG. 15 is a perspective of a ninth preferred embodiment of the current implant where a bend in the third region allows the third and fourth regions to deviate from the longitudinal axis of the first and second region.

Select preferred embodiments of threadless friction fit surgical implant (620) shown in FIG. 9 can be provided with polyaxial head (100) connected to spheroid connector (102) that is attached to first side of barrier (626) opposite the second segment (640). As shown, conduit (624) reciprocates with channel (104) of spheroid connector (102). Polyaxial head (100) includes receptacle (110) that snap fits/locks over spheroid connector (102). As shown in FIG. 15, spheroid connector (102) can be offset of up to about 45 degrees from the longitudinal axis (X-X) of threadless friction fit surgical implant (620).

FIGS. 5-8a are lateral perspectives of threadless friction fit surgical implant (650).

In a preferred embodiment, solid threadless friction fit surgical implant (650) has a longitudinal axis extending through the solid threadless friction fit surgical implant (650). Solid threadless friction fit surgical implant (650) can be provided with an uninterrupted exterior (652), first cylindrical section (654) with rough surfaces (632) and second section (656), adjacent to first cylindrical section (654), with more rough surfaces (632) than the first cylindrical section (654). First cylindrical section (654) includes a first diameter (660) merged with the second section (656).

Second section (656) is provided with first segment (662) proximate first cylindrical section (654). A portion of cross-sectional diameter (664) of first segment (662) is less than, equal to or greater than first diameter (660). Second segment (665) is merged and connected with first segment (662).

Among other things, rough surfaces (632) can include micropores, metal, abrasive particles, dense particles or clumps of particles.

When dictated by the predetermined surgical route, first segment (662) is cylindrical and second segment (665) is conical.

When dictated by the predetermined surgical route, first segment (662) is biconvex and second segment (665) is conical. First segment (662) can be provided with a greater length than curved lengths of each opposed convex side (672a, 672b). First segment (662) can also be ovoid.

When dictated by the predetermined surgical route, first segment (662) is biconcave or concave.

Figure 13:
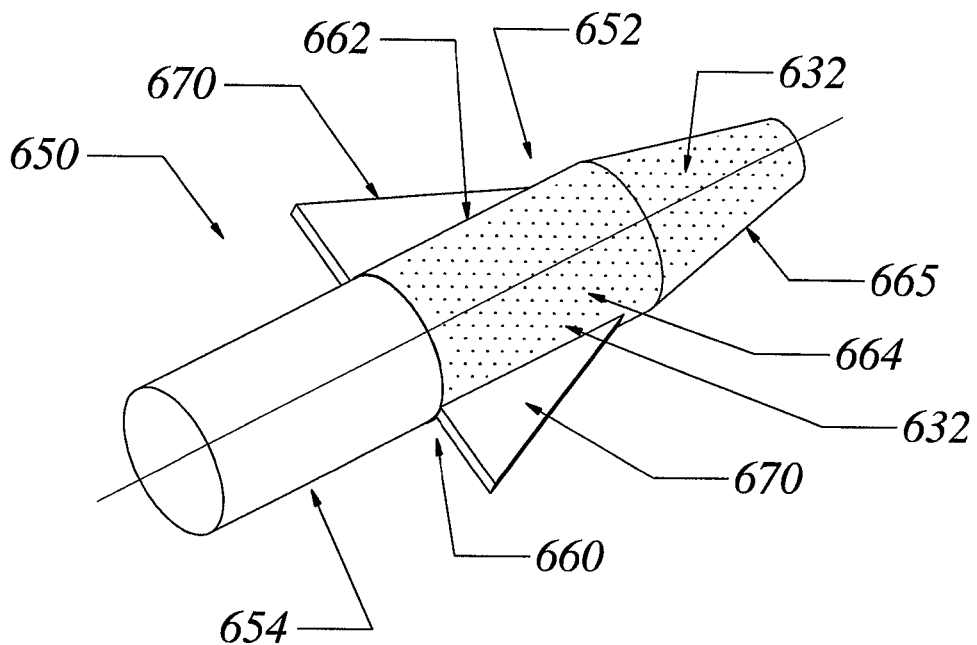
FIG. 13 is a perspective of a seventh preferred embodiment of the current implant.
Figure 14:
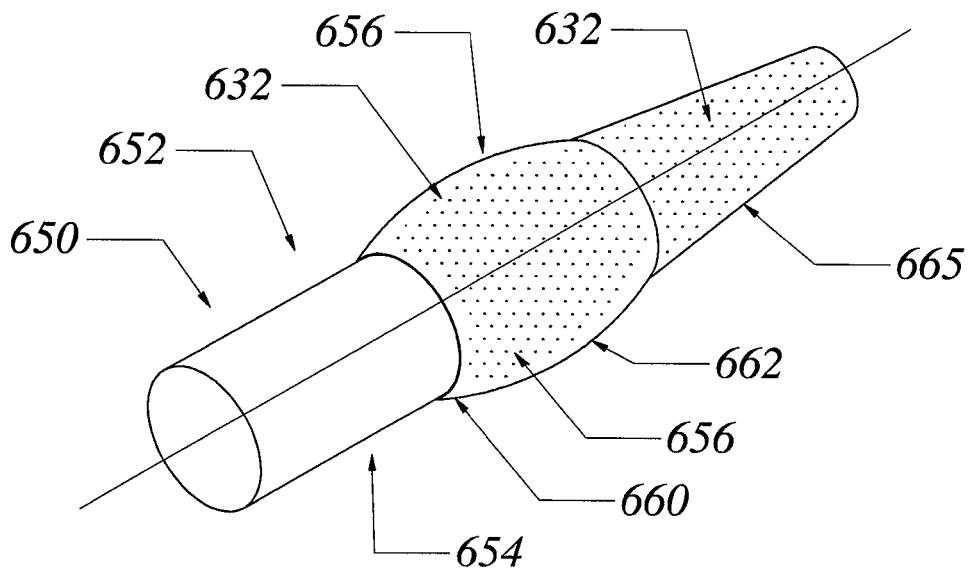
FIG. 14 is a perspective of an eighth preferred embodiment of the current implant.

As shown in FIG. 13, when dictated by the predetermined surgical route, threadless friction fit surgical implant (650) can be provided with wings, bulges or outward expansions (670).

Figure 10:
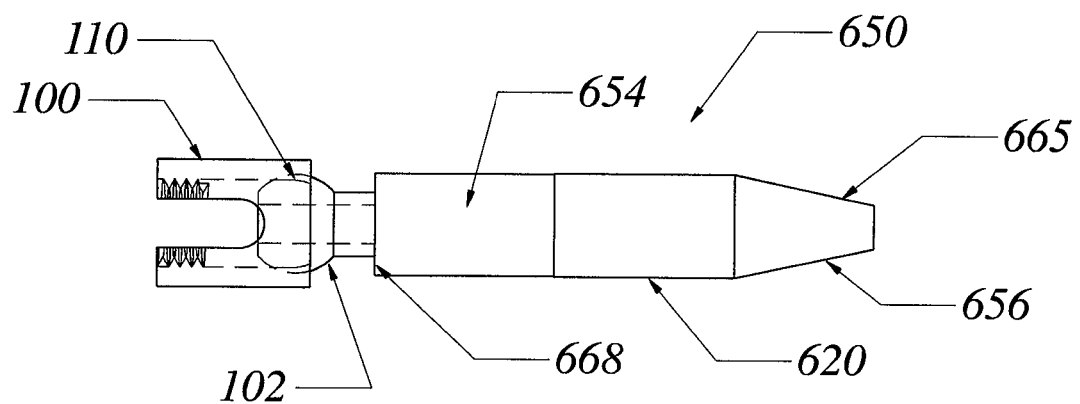
FIG. 10 is a lateral view of a current solid implant and an attachable polyaxial head.
Figure 16:
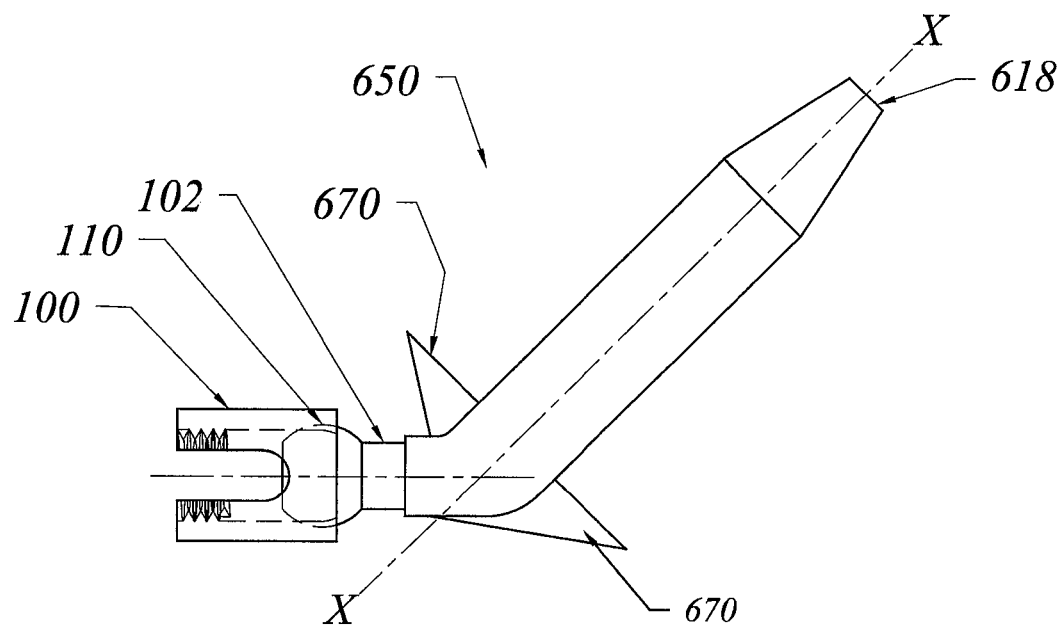
FIG. 16 is a perspective of a tenth preferred embodiment of the current implant where a bend in the third region allows the third and fourth regions to deviate from the longitudinal axis of the first and second region.

Select preferred embodiments of threadless friction fit surgical implant (650) shown in FIG. 10 can be provided with polyaxial head (100) connected to spheroid connector (102) that is attached to first cylindrical section (654). Polyaxial head (100) includes receptacle (110) that snap fits/locks over spheroid connector (102). As shown in FIG. 16, spheroid connector (102) can be offset of up to about 45 degrees from the longitudinal axis (X-X) of threadless friction fit surgical implant (650).

FIG. 17 is exemplary of a traditional state-of-the-art pedicle screw (666). The traditional pedicle screw (666) is threaded. Most threads are sharp and easily cut through osteoporotic bone. Traditional pedicle screws require torsional and directional forces for insertion. Toggle during the application of insertional forces to traditional pedicle screws leads to the creation of a cavity larger than the implant and eventual implant loosening. Pedicle screws are generally of circular symmetry and a few have larger diameters near the head and smaller diameters near the tip. Few pedicle screws (666) are cannulated or fenestrated. Traditional pedicle screws (666) do not have expansions which limit their insertion distance, expansions which disperse transmitted loads over a greater surface area, or expansions which increase the total surface area available for bone ingrowth and implant stabilization. Traditional pedicle screws (666) do not have angled deviations from their longitudinal axes. Traditional pedicle screws (666) require a torsional and directional force for implantation, whereas threadless friction fit implants (620, 650, 690) can be implanted with a single force applied parallel their longitudinal axis.

FIGS. 18a-c show coronal slice views A, B and C of pedicles. Most pedicles are oblong or oval rather than round. The current friction fit surgical implant (620, 650, 690) is portrayed on the left side of FIGS. 18a-c and a traditional pedicle screw (666) is portrayed on the right side of FIGS. 18a-c. Within the current scope of the current invention, friction fit surgical implants (620, 650, 690) can be manufactured for implantation through round, oval, oblong or amorphous pedicles.

FIG. 18a shows a threadless friction fit surgical implant (620, 650, 690) with a lateral expansion (670) abutting the transverse process and preventing further advancement of the device. Third region (636p) is oblong in this embodiment with a lateral wing (670). FIG. 18b is a coronal view. Second region (626p) is oblong in this embodiment at mid-pedicle. FIG. 18c is a coronal view near the entrance to the vertebral body. Second region (626p) is amorphous in this embodiment location with a smaller cross section than the implant seen in FIG. 18b.

Figure 19:
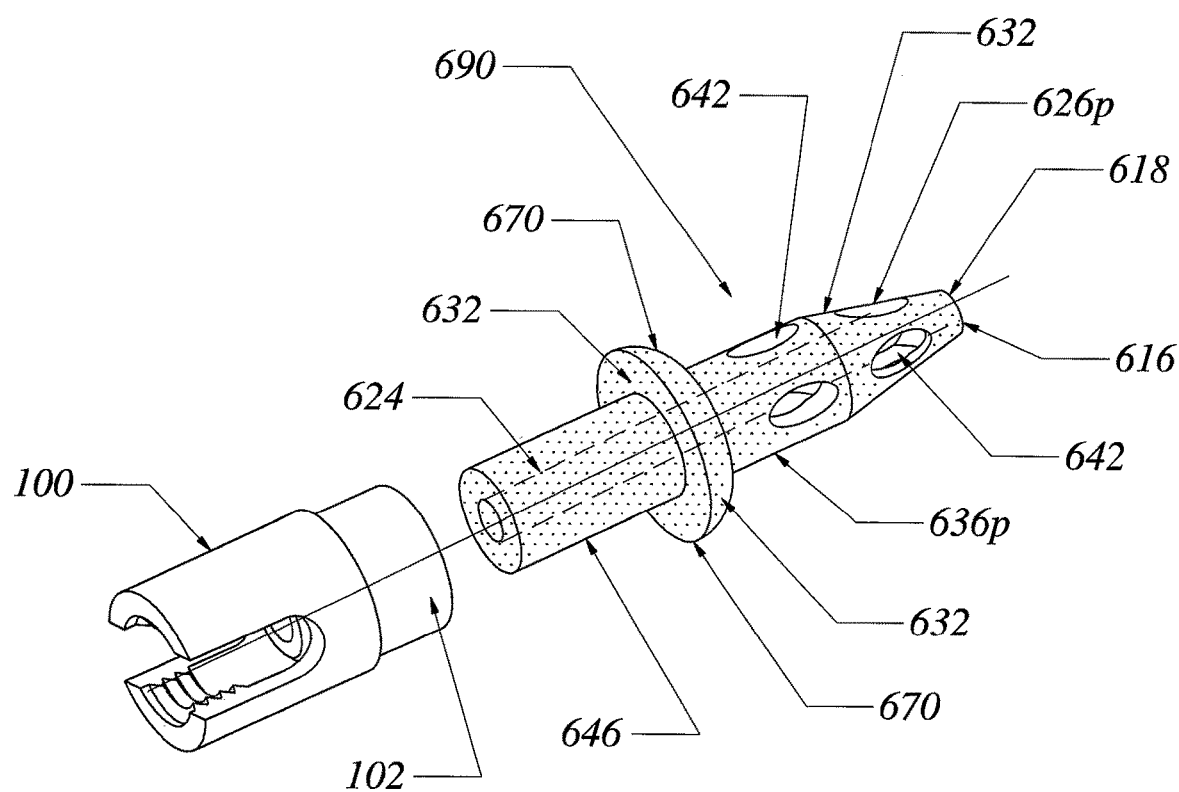
FIG. 19 is a perspective of an eleventh preferred embodiment of the current implant including a polyaxial head attached to the fourth region of the threadless implant.
Figure 20A:
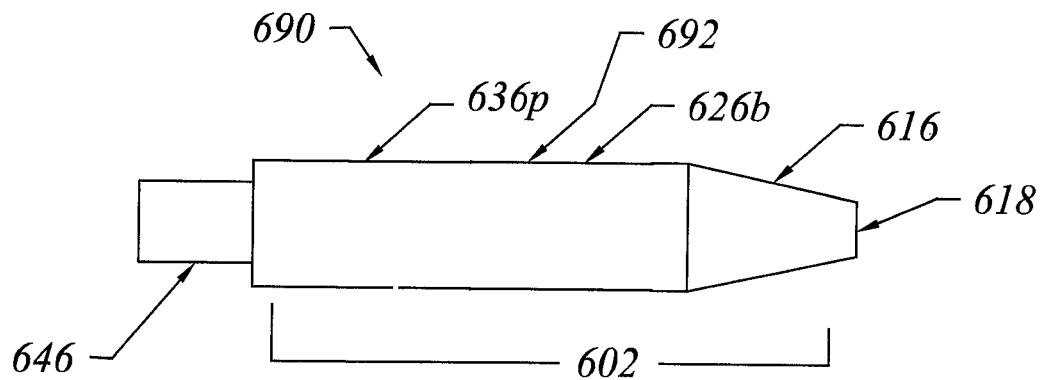
FIGS. 20*a*-20*f* portray additional preferred embodiments of the current implant.
Figure 20B:
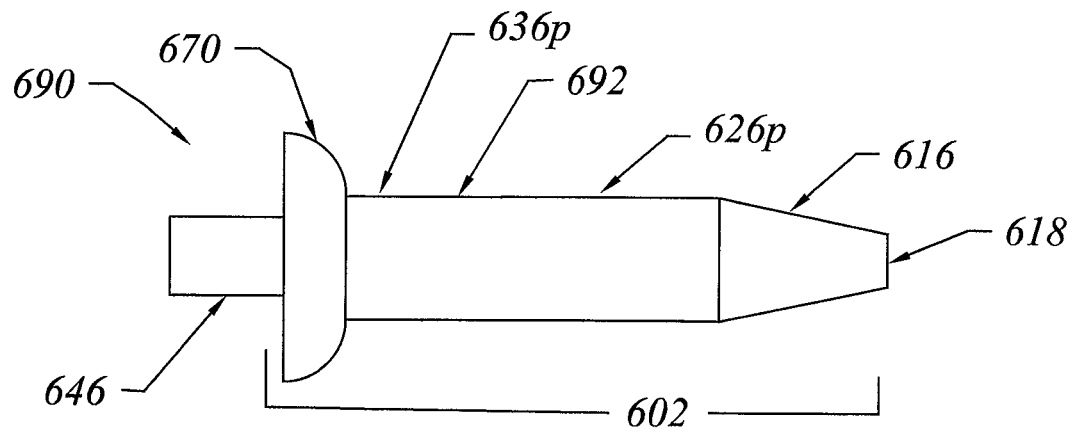
Figure 20C:
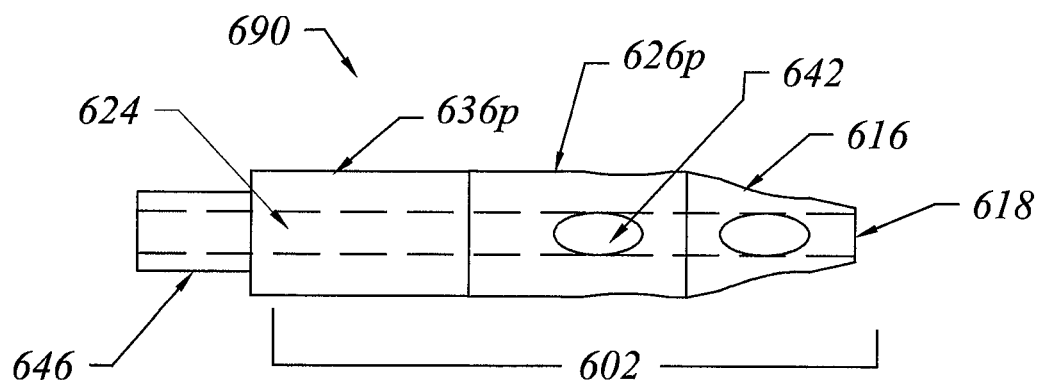
Figure 20D:
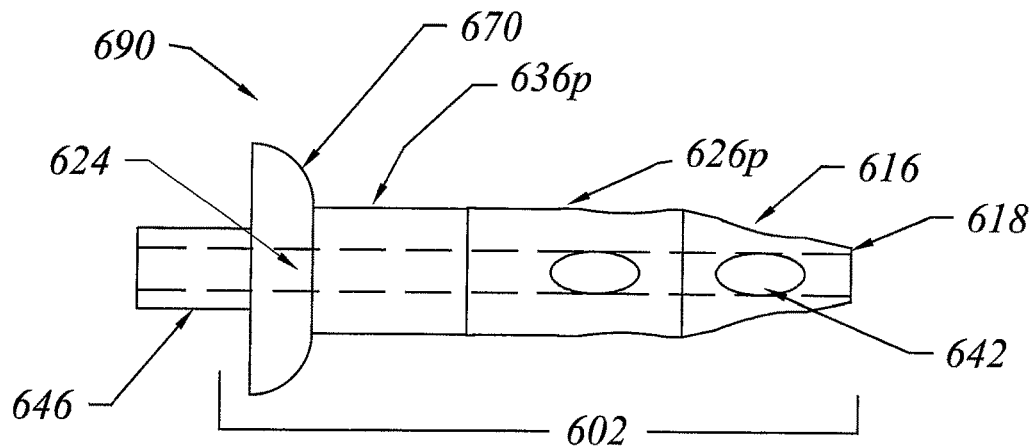
Figure 20E:
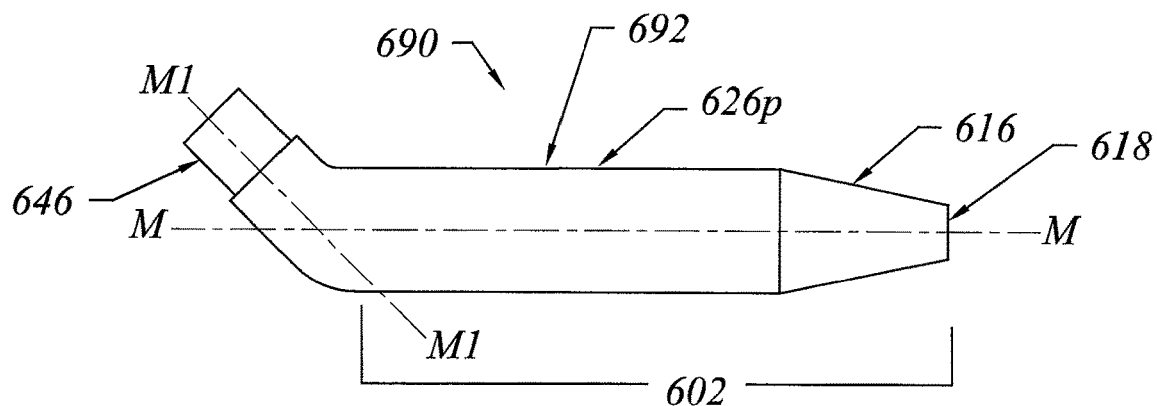
Figure 20F:
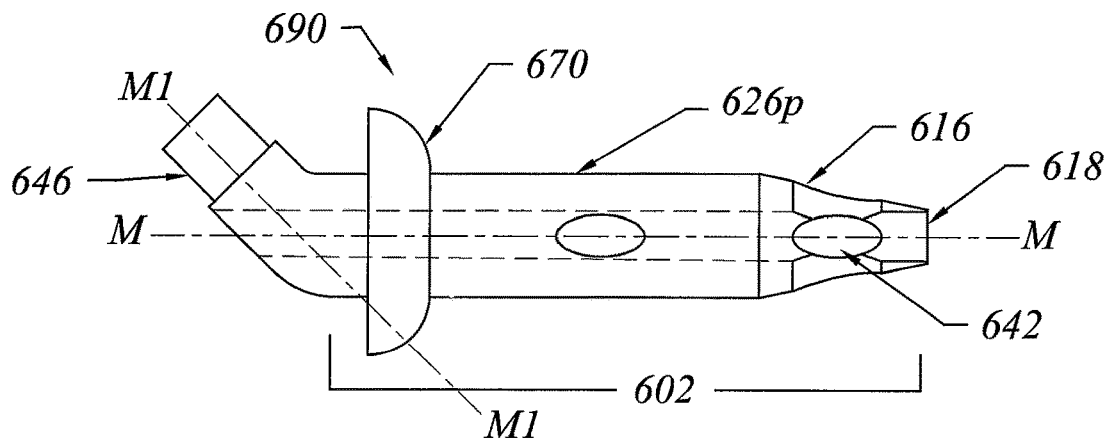

FIG. 19 is a lateral perspective of the threadless friction fit surgical implant (690) including an exploded view of polyaxial head (100) and spheroid connector (102). Threadless friction fit surgical implant (690) is provided with first region (616), second region (626p), third region (636p) and fourth region (646). Conduit (624) traverses first region (616), second region (626p) and third region (636p), and, in select preferred embodiments, can also traverse fourth region (646). First Region (616) can have a blunt tip (618) leading edge in front and connects posteriorly to second region (626p). The threadless friction fit surgical implant (690) in second region (626p) can have dimensions that maximize surface contact area with the geometric dimensions of the target zone. Second region (626p) is connected to first region (616) and third region (636p). Wings, bulges or outward expansions (670) can be incorporated into third region (636p). When anatomic parameters require, bends or curves can be incorporated into third region (636p). Threadless friction fit surgical implant (690) can be provided with one or more openings (642) allowing interactions between conduit (624) and the target zone or surgically created environment proximate threadless friction fit surgical implant (690). Depending on anatomic parameters, any combination of first region (616), second region (626p), third region (636p), fourth region (646) and conduit (624) can be provided with rough surfaces (632). Rough surfaces (632) can include micropores, metal, abrasive particles, dense particles or clumps of particles.

FIGS. 20a-20f show lateral perspectives of preferred embodiments of threadless friction fit surgical implant (690) for implantation into a patient. These preferred embodiments of threadless friction fit surgical implant (690) are provided with four distinct regions. Advancement of the first region (616) along the predetermined route for proper positioning of the threadless friction fit surgical implant (690) creates a cavity. First Region (616) has a blunt tip (618) leading edge in front and connects posteriorly to second region (626p). The respective heights and respective widths of threadless friction fit surgical implant (690) in first region (616) are less than or equal to any height or width in second region (626p). The threadless friction fit surgical implant (690) in second region (626p) can have dimensions that maximize surface contact area with the geometric dimensions of the target zone and the subcortical bone within a target pedicle. Second region (626p) is connected to first region (616) and third region (636p). Third region (636p) can correspond to the area in between the pedicle and the mammillary process. Wings, bulges or outward expansions (670) can be incorporated into third region (636p). Bends or curves can be incorporated into third region (636p). First region (616), second region (626p) and third region (636p) share a common midline (M-M). Fourth region (646) can share the common midline (M-M) or fourth region (646) can be provided with secondary midline (M1-M1) that is offset of up to about 45 degrees from the common midline (M-M). It is believed that offsetting the fourth region (646) can facilitate easier connection with devices distinct from threadless friction fit surgical implant (690); reduce muscle dissection required for implantation; reduce postoperative "dead space;" and reduce the need for bending connection rods, thereby improving construct strength.

Threadless friction fit surgical implant (690) is provided with first region (616), second region (626p), third region (636p) and fourth region (646) where the regions (616, 626p, 636p, 646) are interconnected. Reference number (602) approximates the combined length of first region (616), second region (626p) and third region (636p).

A preferred embodiment of threadless friction fit surgical implant (690) includes conduit (624) adapted to carry one or more biocompatible substances. Conduit (624) traverses first region (616), second region (626p) and third region (636p). Barrier (626) also surrounds conduit (624). In select preferred embodiments, conduit (624) can traverse fourth region (646) and barrier (626) surrounds fourth region (646). First region (616) includes a blunt tip (618). Outward dimensions of first region (616) are nearer to the conduit (624) than outward dimensions of the second region (626p) and third region (636p). Third region (636p) can be provided with one or more wings or bulges (670) incorporated with the barrier (626) where the wings (676) correspond to a target zone for implantation. Rough surfaces (632) can be applied to first region (616), second region (626p) and third region (636p). Threadless friction fit surgical implant (690) can be provided with one or more openings (642) allowing interactions between conduit (624) and the target zone or surgically created environment proximate threadless friction fit surgical implant (690). Fourth region (646), without rough surfaces (632), is connectable to a device distinct from threadless friction fit surgical implant (690). Rough surfaces (632) can include micropores, metal, abrasive particles, dense particles or clumps of particles. Polyaxial head (100) can be connected to fourth region (646). Fourth region (646)

can be provided with secondary midline (M1-M1) that is offset of up to about 45 degrees from the common midline (M-M) of first region (616), second region (626p) and third region (636p). In select preferred embodiments, the fourth region (646) can include rough surfaces (632) and the first region (616), the second region (626p) and the third region (636p) have more of the rough surfaces (632) than the fourth region (646).

Another preferred embodiment of threadless friction fit surgical implant (690) includes an uninterrupted exterior (692). First region (616) includes a blunt tip (618). Outward dimensions of first region (616) are nearer to the conduit (624) than outward dimensions of the second region (626p) and third region (636p). Third region (636p) can be provided with one or more wings or bulges (670) uninterrupted exterior (692) where the wings (676) correspond to a target zone for implantation. Rough surfaces (632) can be applied to first region (616), second region (626p) and third region (636p). Fourth region (646), without rough surfaces (632), is connectable to a device distinct from threadless friction fit surgical implant (690). Rough surfaces (632) care created by either additive or subtractive means or a combination thereof and can include micropores, metal, abrasive particles, dense particles or clumps of particles. Polyaxial head (100) can be connected to fourth region (646). Fourth region (646) can be provided with secondary midline (M1-M1) that is offset of up to about 45 degrees from the common midline (M-M) of first region (616), second region (626p) and third region (636p). In select preferred embodiments, the fourth region (646) can include rough surfaces (632) and the first region (616), the second region (626p) and the third region (636p) have more rough surfaces (632) than the fourth region (646).

FIGS. 21a-21f show lateral perspectives of preferred embodiments of threadless friction fit surgical implant (690) shown in FIGS. 20a-20f that also includes rough surfaces (632).

Figure 21A:
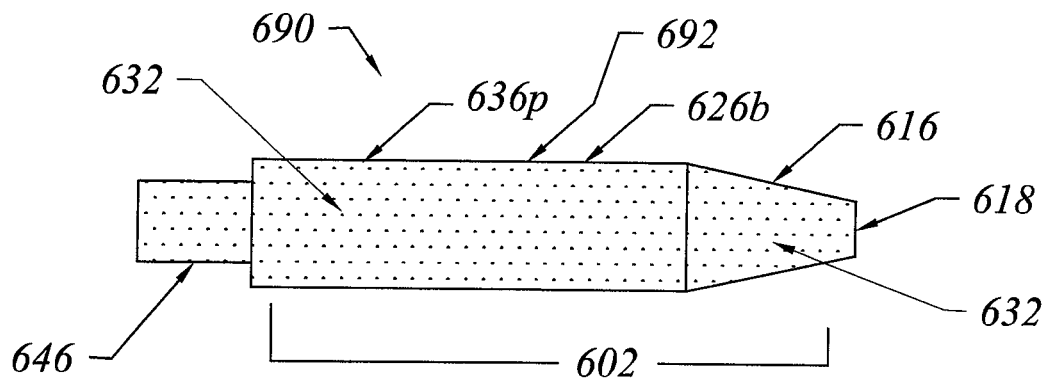
FIGS. 21*a*-21*f* portray additional preferred embodiments of the current implant with rough surfaces.
Figure 21B:
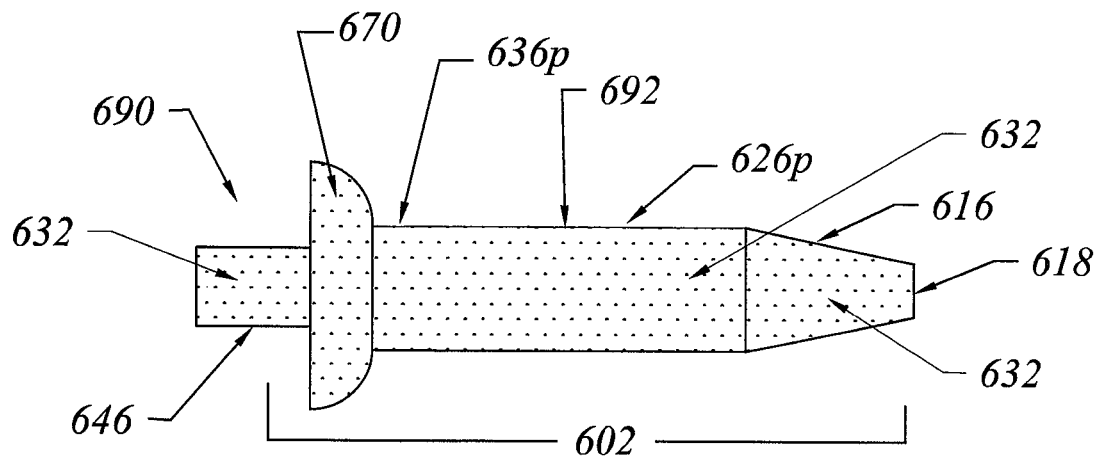
Figure 21C:
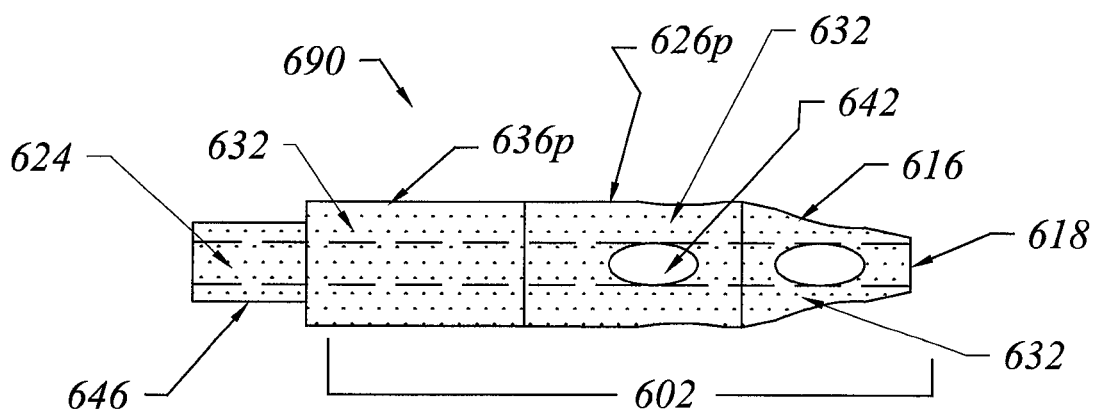
Figure 21D:
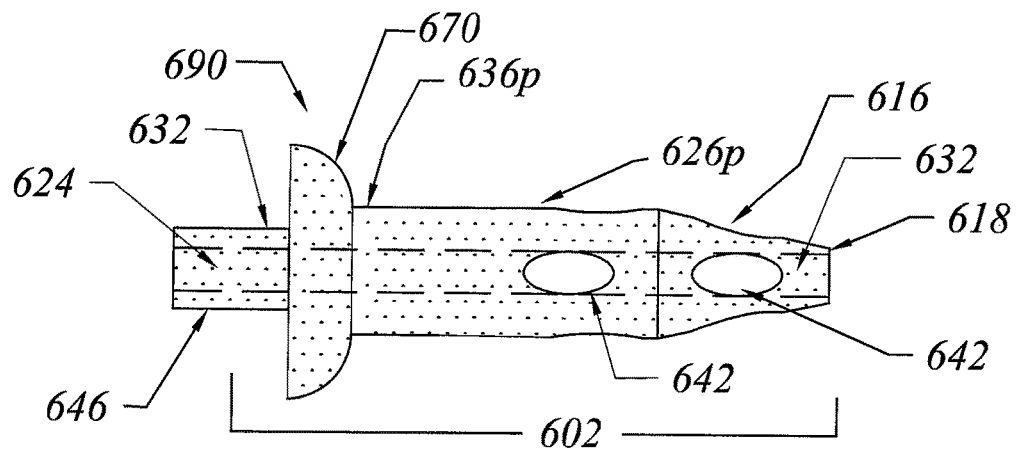
Figure 21E:
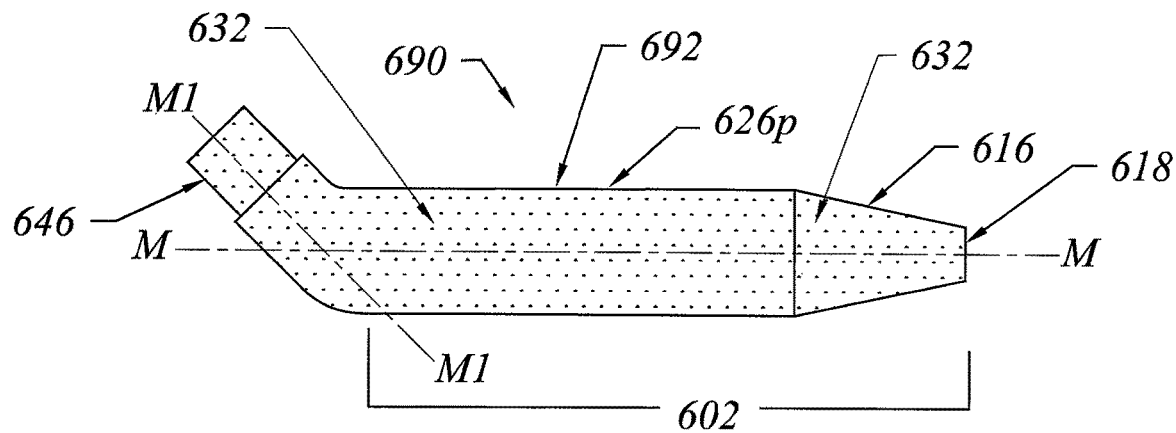
Figure 21F:
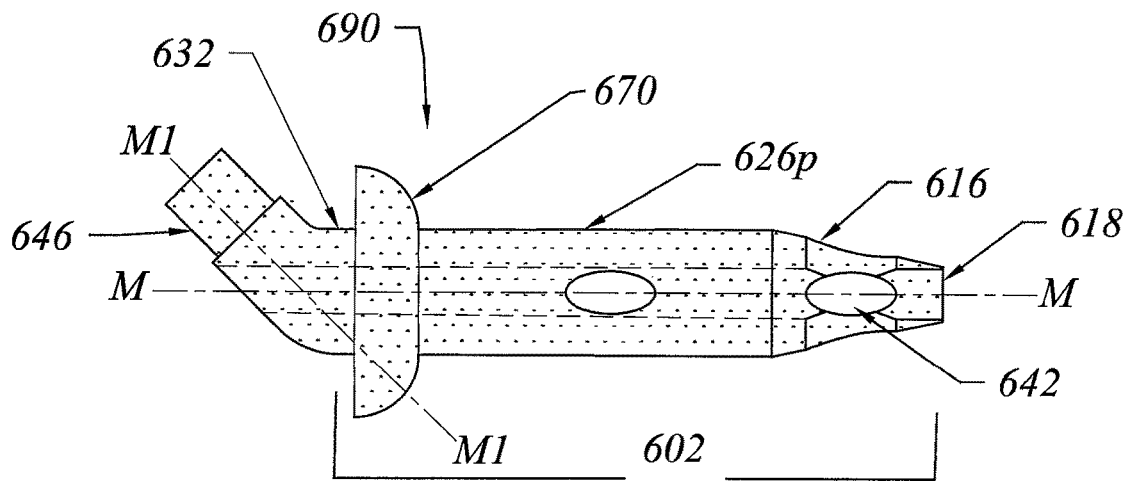
Figure 21G:
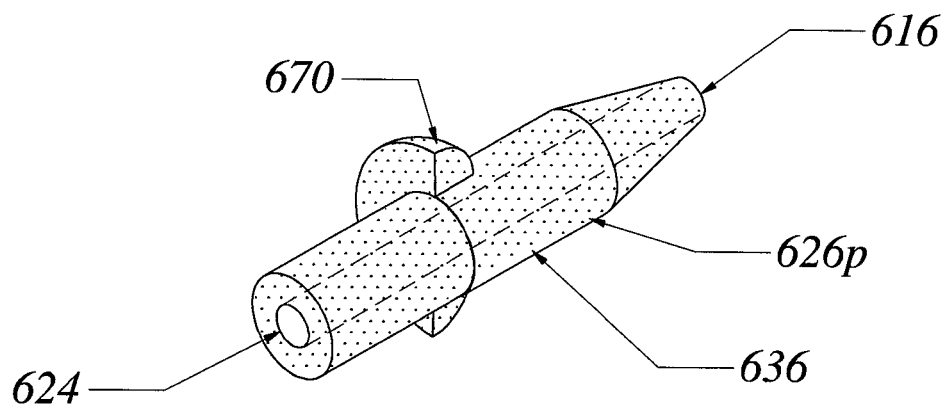
FIGS. 21*g*-21*i* portray preferred embodiments of the current implant including varying degrees of bulge or outward expansions (670).
Figure 21H:
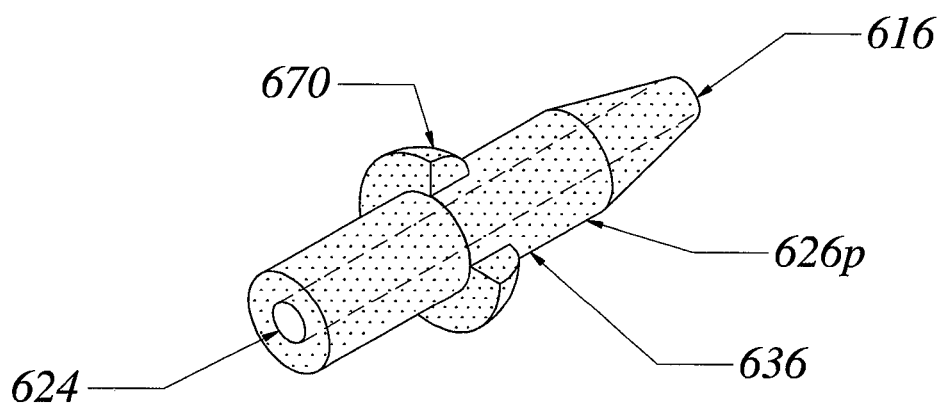
Figure 21I:
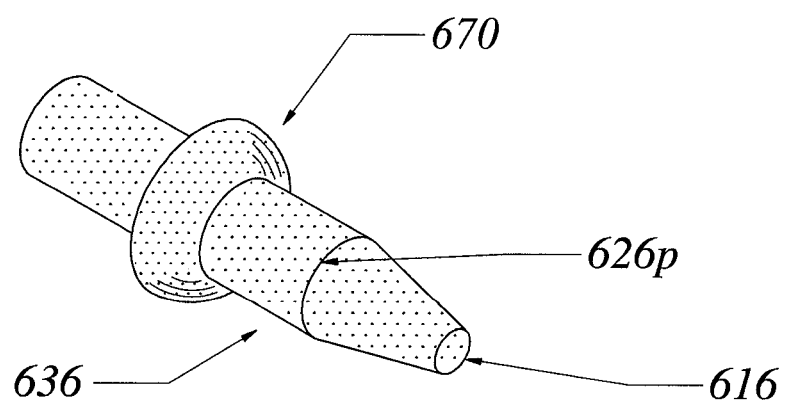

FIGS. 21g-21i are illustrative of types of three-dimensional bulges or outward expansions (670) attachable to surgical implant (620, 650, 690).

For this Application, the word "gas" is defined as, "a substance in a physical state in which it does not resist change of shape and will expand to fill any container."

For this Application, the word "liquid" is defined as, "a substance that does not resist change of shape but does resist change of volume."

For this Application, the word "solid" is defined as, "a substance with a length, a height, and a width that exhibits rigidity and is without outward openings visible to humans without magnification."

With reference to FIGS. 22, 23, 24, 24A, 25A, 25B, 25C, 25D, 25E, 25F, 26, 27, 28, 29 and 30, preferred embodiments of the threadless spinal implant (690) and devices distinct from the threadless implant (690) are enabled.

Exterior (652) surrounds a conduit (624) that extends through a length of the threadless spinal implant (690). Spinal implant (690) is provided with first region (616), second region (626p), third region (636p) and fourth region (646). First region (616) guides threadless spinal implant (690) into a prearranged location in a surgical field. Fourth region (646) is proximate the surgeon and is adapted to receive an insert (750, 750a) distinct from the spinal implant (690).

Third region (636p) and second region (626p) are positioned between fourth region (646) and first region (616). First region (616), second region (626p), third region (636p) and fourth region (646) are threadless. Regions (616, 626p, 636p, 646) are positioned about the longitudinal axis (X-X) of threadless spinal implant (690). In preferred embodiments, first region (616), second region (626p) and third region (636p) are provided with porous or rough outer surfaces (632) while fourth region (646) includes a smoother outer surface than the porous or rough outer surfaces (632) of first region (616), second region (626p) and third region (636p).

In select preferred embodiments, conduit (624) of fourth region (646) can receive an insert (750) such as a nail or a rod. Nail (750) can include head (756) connectable to polyaxial connector (100) and shaft (758). Shaft (758) can be fitted into conduit (624). Within the scope of the current invention, nail (750), head (756) and shaft (758) are threadless. Nail (750) can be provided with protrusions (780a, 780b). Rod (750a) is also threadless and can be fitted into conduit (624).

In select preferred embodiments, outward expansion (677) of conduit (624) in third region (636p) creates a lock (677) for nail (750) or other device distinct from threadless spinal implant (690). Protrusions (780a, 780b) of nail (750) are adapted to interlock with one or more locks (677).

One or more outward expansions (670b) of exterior surface (652) of third region (636p) can be provided with first graduated slope (672) and second graduated slope (674). In select preferred embodiments, second graduated slope (674) is connected to and opposed from first graduated slope (672). In operation, second graduated slope (674) inhibits insertion of the threadless spinal implant (690) beyond a preselected distance into the identified anatomic location of the surgical field. Second graduated slope (674) can prevent threadless spinal implant (690) from contacting nerves and blood vessels distal to the predetermined implant position. Embodiments with two or more second graduated slopes (674) can also reduce threadless spinal implant (690) toggle, should the device loosen, and reduce the risk of damage to nerves, blood vessels, or dural tissues.

Outward dimensions of third region (636p) are greater than second region (626p) while outward dimensions of first region (616) are less than outward dimensions of second region (626p). In select preferred embodiments, first region (616) can be round, oblong or oval. On insertion, first region (616) is guided along the predetermined surgical route creating a cavity. Second region (626p) and the third region (636p) enlarge the cavity until the second graduated slope (674) inhibits further insertion of the threadless spinal implant (690) into identified anatomic location.

Depending on medical or anatomical parameters, second region (626p) can have one or more openings (642). Openings (642) can be in communication with conduit (624). First region (616) expands outward from the longitudinal axis (X-X) as the first region (616) approaches the second region (626p). Fourth region (646) can include one or more slits (678) through the exterior (652). Slits (678) can allow for outward expansion of fourth region (646).

In select preferred embodiments of the threadless spinal implant (690), relative to the longitudinal axis (X-X), second region (626p) can be: round and adapted to expand symmetrically, asymmetrical and adapted to expand in a medial, a lateral, a superior and/or an inferior plane. Depending on the patient's anatomic parameters, in other embodiments, first region (616) and second region (626p) can be amorphous.

In other preferred embodiments, threadless spinal implant (690), a portion of first graduated slope (672) and second graduated slope (674) create a wing (676). One or more wings (676) can extend from the one or more outward expansions (670b). One or more wings (676) is/are adapted to engage a structure outward of from the surgical route, such as the transverse process. In select preferred embodiments, wing (676) can include an eyelet (675).

Illustrations of some of the uses of the current threadless spinal implant (690) are set forth below.

The preoperative plan includes a predetermined surgical route and final position for threadless spinal implant (680). The surgeon can attach an insertion tool to the exterior surface (652) of the fourth region (646) or within conduit (624). For most spinal surgeries, the predetermined route starts posteriorly at the vertebra's mammillary process. Threadless spinal implant (690) is advanced anteriorly through the pedicle and into the vertebral body. The threadless spinal implant (690) is advanced until second graduated slope (674) of the third region (636*p*) prevents further advancement. First region (616) is smaller than the pedicle to reduce friction during implant insertion. Second region (626*p*) is larger in size than first region (616) and second region (626*p*) approximates the anatomical dimensions of the pedicle. Third region (636*p*) has larger outward dimensions than the second region (626*p*) preventing the third region from advancing into the pedicle. Wings (670) and enlargements in the third region (636*p*) also deter advancement of threadless spinal implant (690) while increasing the surface contact area of threadless spinal implant (690) with the posterior elements of the vertebra. The increased surface area allows for more efficient transfer of loads from one vertebra to another when implants at adjacent levels are connected. Efficient transfer of loads across large surface areas reduces the likelihood of threadless spinal implant (690) loosening.

After insertion of the threadless spinal implant (690) into the predetermined final position, connection to other threadless devices is accomplished by a coupling device distinct from the threadless spinal implant (690) and/or a rod distinct from the threadless spinal implant (690). Those skilled in the art recognize that the coupling device can be either side loading or top loading. Side loading coupling devices can slide over fourth region (646) of threadless spinal implant (690) and be tightened to both the implant and the connecting rod. Top loading devices, such as poly-axial heads, can utilize conduit (624) and expansions (677) to secure the coupling device to threadless spinal implant (690). Prior to use of a top loading coupling device, substances can be injected through the conduit (624) to facilitate implant stabilization and/or increase vertebral body strength.

Figure 22:
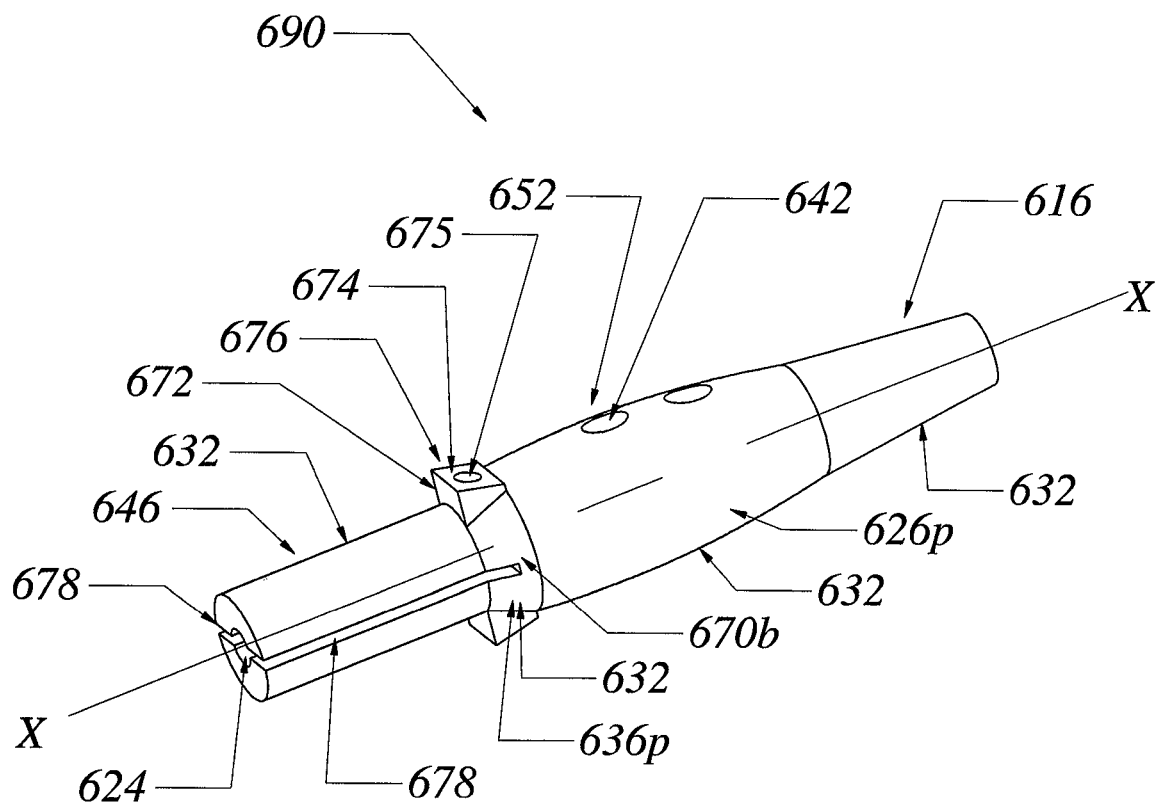
FIG. 22 portrays an implant (690) including one or more slits (678).

FIG. 22 portrays an implant (690) including one or more slits (678).

Figure 23:
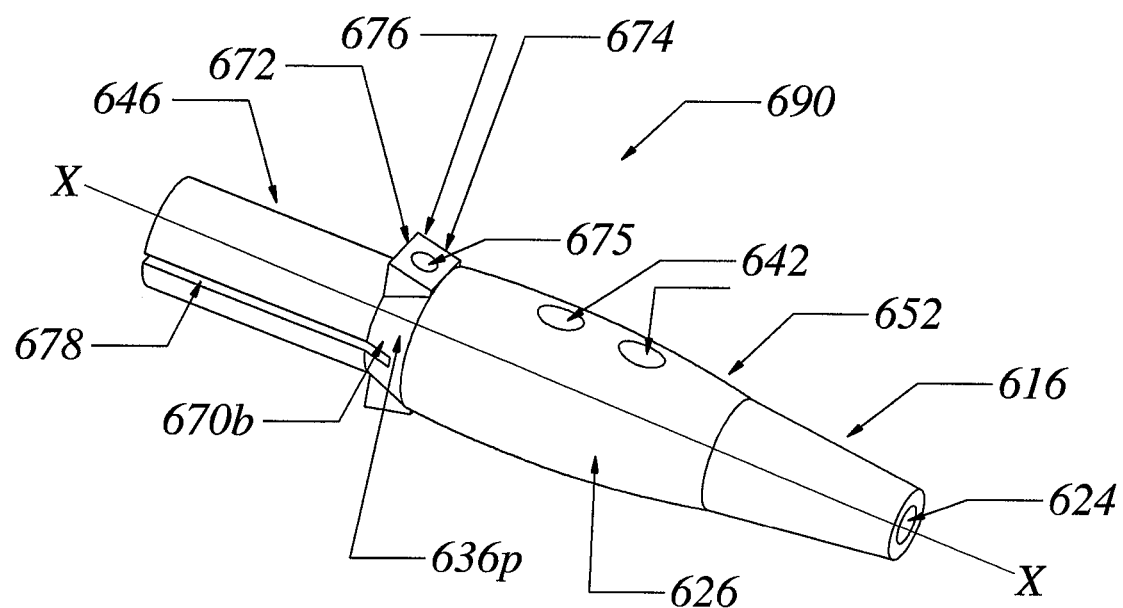
FIG. 23 portrays an implant (690) including one or more openings (642).

FIG. 23 portrays an implant (690) including one or more openings (642).

Figure 24:
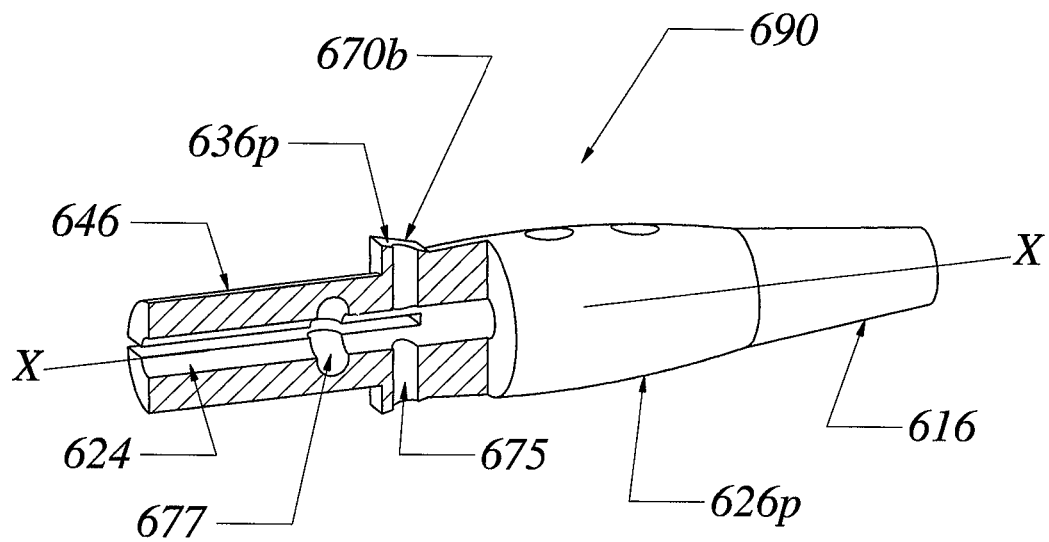
FIG. 24 is a perspective of implant (690) with portions of fourth region (646), third region (636*p*) and second region (626*p*) cut away.

FIG. 24 is a perspective of implant (690) with portions of fourth region (646), third region (636*p*) and second region (626*p*) cut away.

Figure 24A:
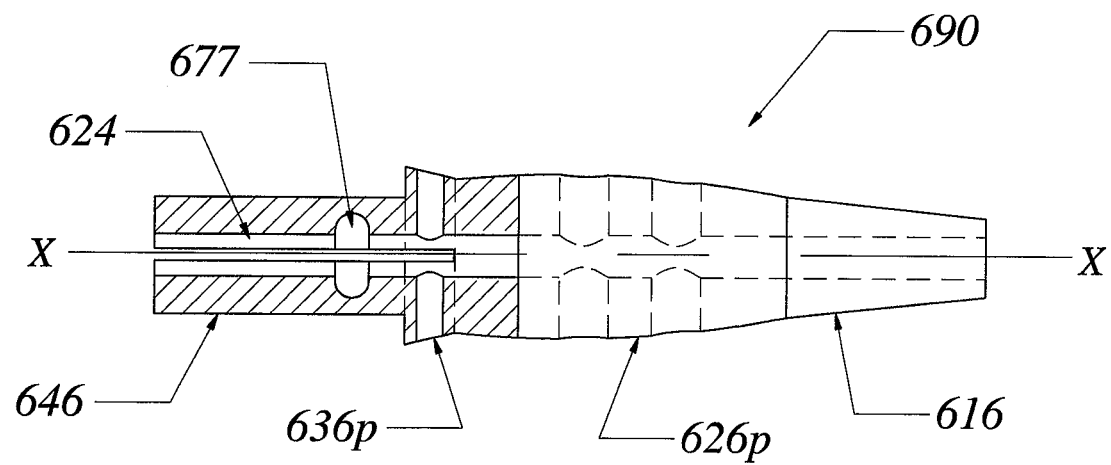
FIG. 24A is a longitudinal cross-section of fourth region (646), third region (636*p*), second region (626*p*) and first region (616) of spinal implant (690).

FIG. 24A is a longitudinal cross-section of fourth region (646), third region (636*p*), second region (626*p*) and first region (616) of spinal implant (690).

Figure 25A:
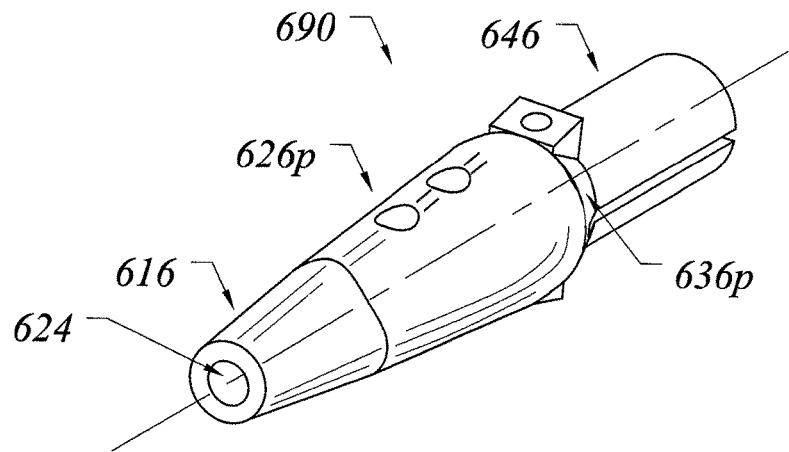
FIG. 25A is a perspective of a generally circular spinal implant (690) with round conduit (624).

FIG. 25A is a perspective of a generally circular spinal implant (690) with round conduit (624).

Figure 25B:
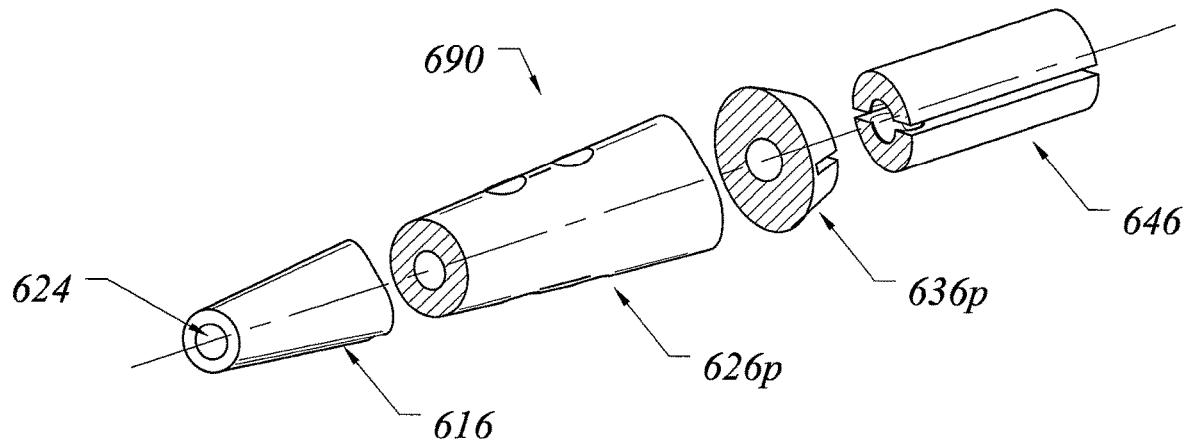
FIG. 25B is an exploded view of FIG. 25A.

FIG. 25B is an exploded view of FIG. 25A.

Figure 25C:
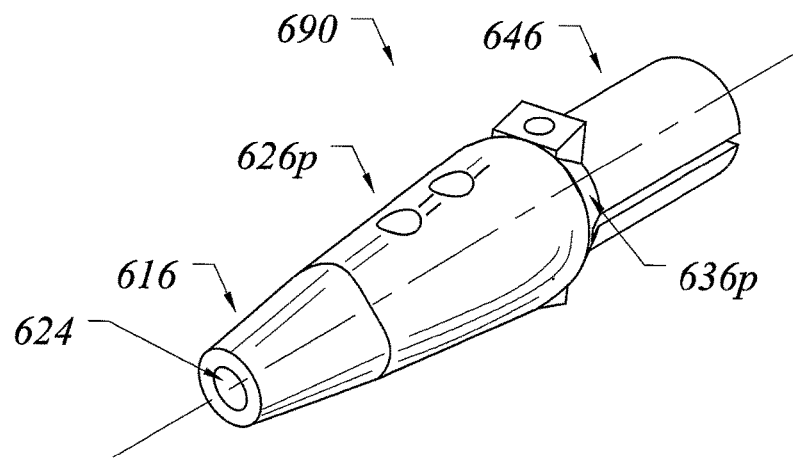
FIG. 25C is a perspective of a generally elliptical spinal implant (690) with an elliptical conduit (624).

FIG. 25C is a perspective of a generally elliptical spinal implant (690) with an elliptical conduit (624).

Figure 25D:
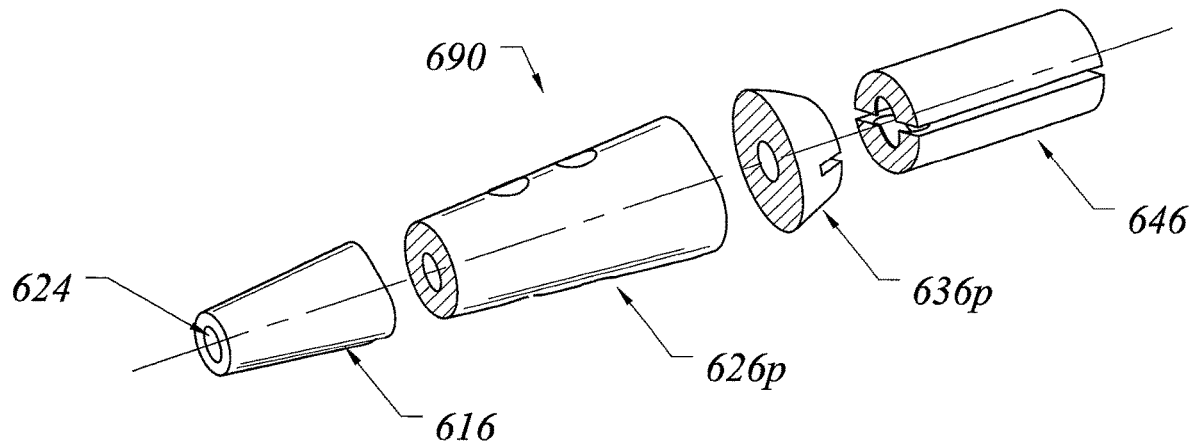
FIG. 25D is an exploded view of FIG. 25C.

FIG. 25D is an exploded view of FIG. 25C.

Figure 25E:
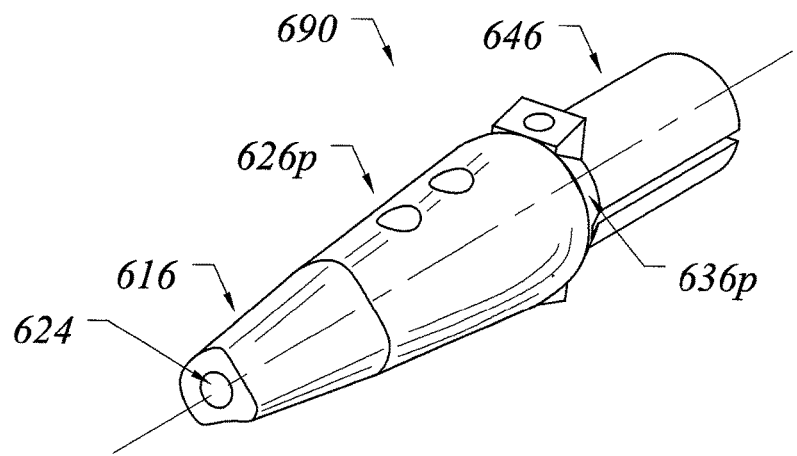
FIG. 25E is a perspective of a spinal implant (690) with an amorphous exterior.

FIG. 25E is a perspective of a spinal implant (690) with an amorphous exterior.

Figure 25F:
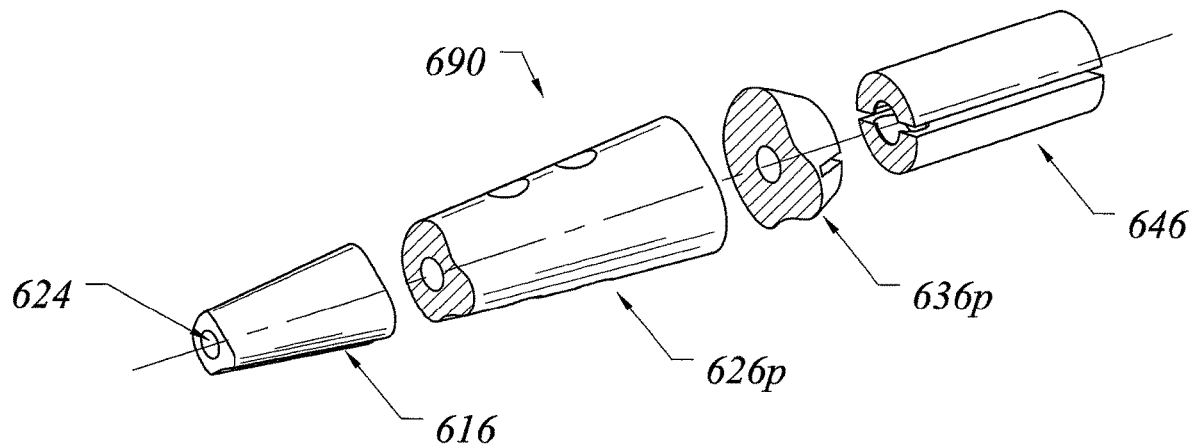
FIG. 25F is an exploded view of FIG. 25E.

FIG. 25F is an exploded view of FIG. 25E.

Figure 26:
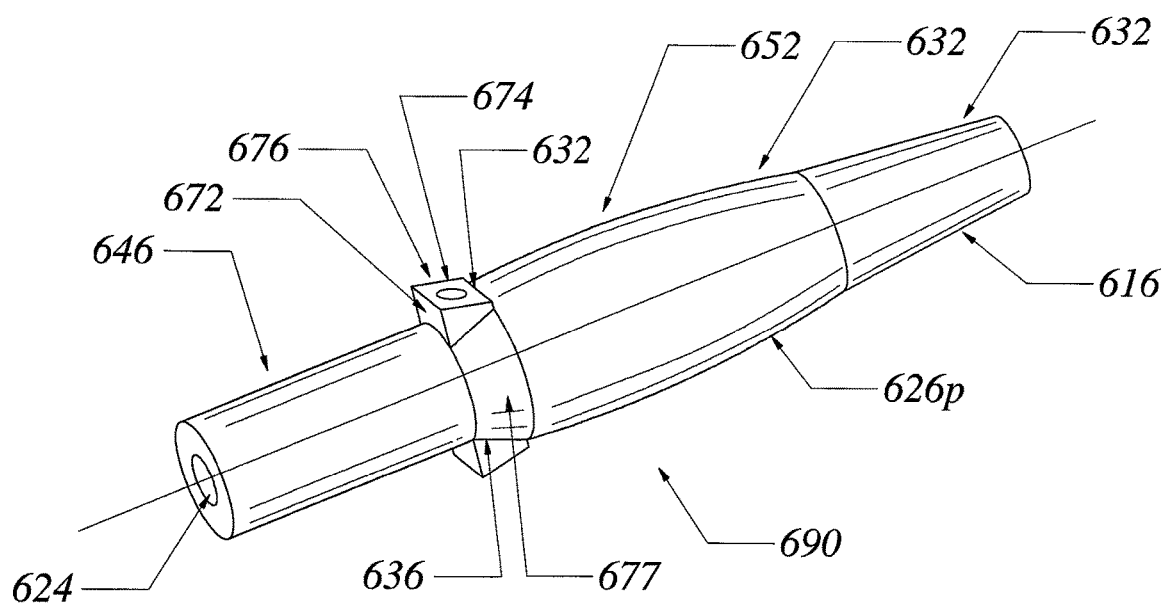
FIG. 26 is a perspective of FIG. 25C is a perspective of a generally elliptical spinal implant (690) with an elliptical conduit (624) where the spinal implant (690) does not include openings (642).

FIG. 26 is a perspective of FIG. 25C is a perspective of a generally elliptical spinal implant (690) with an elliptical conduit (624) where the spinal implant (690) does not include openings (642).

Figure 27:
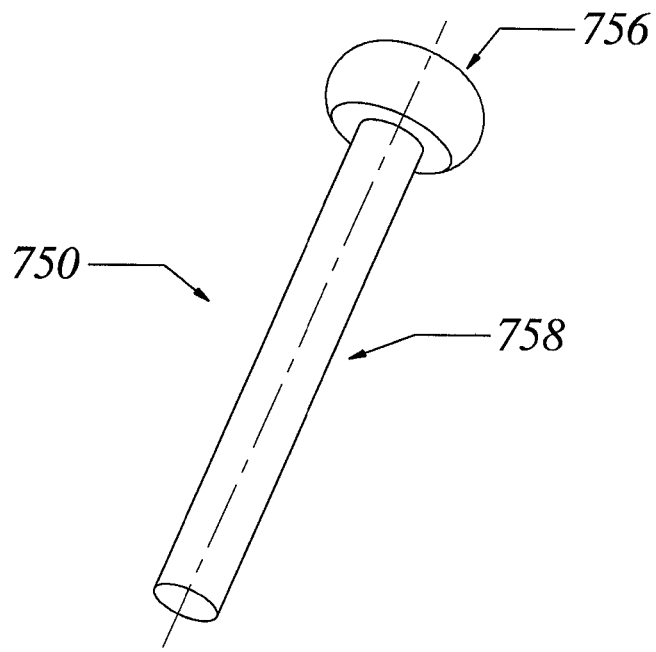
FIG. 27 is an embodiment of an insert (750) distinct from the spinal implant (690).

FIG. 27 is an embodiment of an insert (750) distinct from the spinal implant (690).

Figure 28:
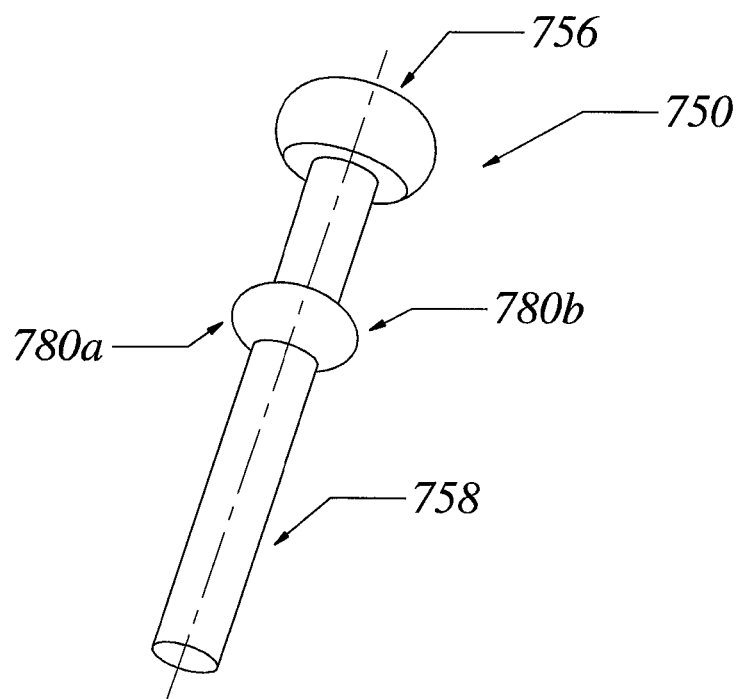
FIG. 28 is another embodiment of an insert (750) distinct from the spinal implant (690).

FIG. 28 is another embodiment of an insert (750) distinct from the spinal implant (690).

Figure 29:
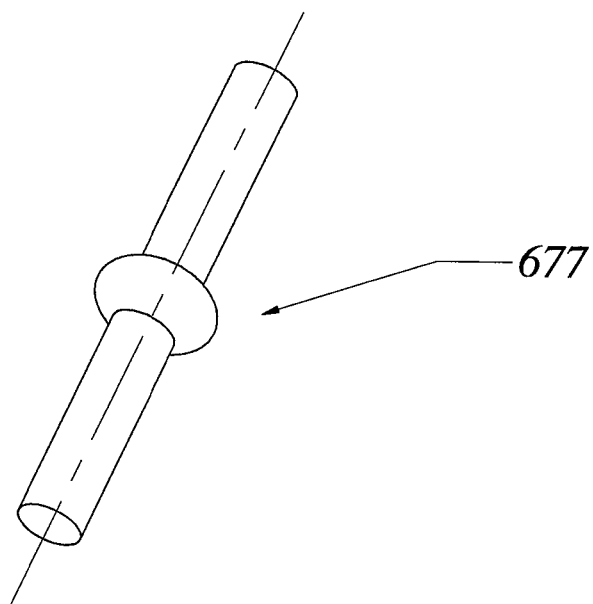
FIG. 29 is yet another embodiment of an insert (750) distinct from the spinal implant (690).

FIG. 29 is yet another embodiment of an insert (750) distinct from the spinal implant (690).

Figure 30:
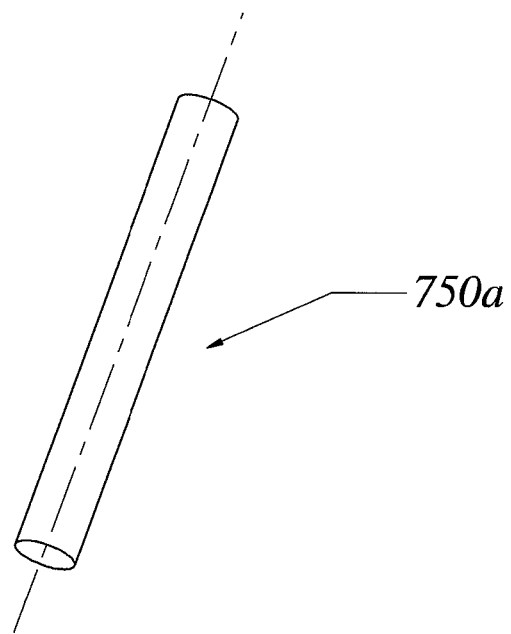
FIG. 30 is yet another embodiment of an insert (750*a*) distinct from the spinal implant (690).

FIG. 30 is yet another embodiment of an insert (750*a*) distinct from the spinal implant (690).

Applicant has enabled, described and disclosed the invention as required by Title 35 of the United States Code.

What is claimed is:

1. A threadless spinal implant comprising:
   a) an unmovable exterior relative to a longitudinal axis (X-X) of the threadless spinal implant, the unmovable exterior surrounding a conduit extending through a length of the threadless spinal implant while not altering the unmovable exterior;
   b) a fourth region, proximate a surgeon, adapted to receive an insert distinct from the spinal implant and a first region guiding the threadless spinal implant along a predetermined route to a predetermined position;
   c) a third region and a second region positioned between the fourth region and the first region; the regions being threadless and positioned about the longitudinal axis (X-X) of the threadless spinal implant; the first region, the second region and the third region comprising porous or rough outer surfaces and the fourth region comprising a smoother outer surface, wherein the third region is proximate the fourth region; and
   d) an outward expansion of an inner wall of the conduit in the third region creating a lock, and one or more outward expansions of the unmovable exterior surface of the third region comprising a first graduated slope perpendicular to the longitudinal axis (X-X) and adjacent to a second graduated slope connected to the third region; the second graduated slope inhibiting insertion of the threadless spinal implant beyond a preselected distance, wherein the third region has a greater girth than the fourth region, the third region and the first region, and on insertion, the first region creates the predetermined surgical route and the second region and the third region gradually enlarge the surgical route until the second graduated slope inhibits further insertion of the threadless spinal implant.

2. The threadless spinal implant of claim 1, wherein the second region comprises one or more openings.

3. The threadless spinal implant of claim 2, wherein:
   a) the first region expands about the longitudinal axis as the first region approaches the second region; and
   b) the fourth region comprises one or more slits through the exterior.

4. The threadless spinal implant of claim 3, wherein:
   a) the first region is round, oblong or oval;
   b) relative to the longitudinal axis, the second region is:
      i) round and adapted to expand symmetrically; or
      ii) asymmetrical and adapted to expand in a medial, a lateral, a superior and/or an inferior plane; or
   c) the first region and the second region are amorphous.

5. The threadless spinal implant of claim 4, wherein a portion of the first graduated slope and the second graduated slope creates a wing extending from the one or more outward expansions and the wing is adapted to engage a structure outward of from the predetermined surgical route.

6. A threadless spinal implant comprising:
a) an unmovable exterior relative to a longitudinal axis (X-X) of the threadless spinal implant, the unmovable exterior surrounding a conduit extending through a length of the threadless spinal implant;
b) a fourth region, proximate a surgeon, adapted to receive an insert distinct from the spinal implant and a first region guiding the threadless spinal implant along a predetermined surgical route to a predetermined position;
c) a third region and a second region positioned between the fourth region and the first region; the regions being threadless and positioned about the longitudinal axis (X-X) of the threadless spinal implant; the first region, the second region and the third region comprising porous or rough outer surfaces and the fourth region comprising a smoother outer surface, wherein the third region is proximate the fourth region; and
d) one or more outward expansions of the unmovable exterior surface, relative to the longitudinal axis (X-X), of the third region, comprising a first slope and a second graduated slope connected to the third region; the first slope perpendicular to the longitudinal axis and the second graduated slope inhibiting insertion of the threadless spinal implant beyond a preselected distance, wherein the third region has a greater girth than the fourth region, the third region and the first region, and on insertion, the first region creates a predetermined surgical route and the second region and the third region gradually enlarge the surgical route until the second graduated slope inhibits further insertion of the threadless spinal implant.

7. The threadless spinal implant of claim 6, wherein:
a) an outward expansion of an inner wall of the conduit in the third region creates a lock for the insert; and
b) the second region comprises one or more openings.

8. The threadless spinal implant of claim 7, wherein:
a) the first region expands about the longitudinal axis as the first region approaches the second region; and
b) the fourth region comprises one or more slits through the exterior.

9. The threadless spinal implant of claim 7, wherein:
a) the first region expands about the longitudinal axis as the first region approaches the second region; and
b) the fourth region comprises opposed one or more slits parallel the longitudinal axis.

10. The threadless spinal implant of claim 9, wherein:
a) the first region is round, oblong or oval;
b) relative to the longitudinal axis, the second region is:
  i) round and adapted to expand symmetrically; or
  ii) asymmetrical and adapted to expand in a medial, a lateral, a superior and/or an inferior plane; or
c) the first region and the second region are amorphous.

11. The threadless spinal implant of claim 9, wherein a portion of the first graduated slope and the second graduated slope creates a wing extending from the one or more outward expansions and the wing is adapted to engage a structure outward from the predetermined surgical route.

12. A threadless spinal implant for implantation into a surgical field; the threadless spinal implant comprising:
a) a longitudinal axis extending through the spinal implant and a conduit centered about the longitudinal axis; the conduit extending through an entire length of the spinal implant;
b) an unmovable exterior relative to the longitudinal axis (X-X)-surrounding the conduit, comprising:
  i) a fourth region proximate a surgeon;
  ii) a first region guiding the threadless spinal implant along a predetermined surgical route to a predetermined position;
  iii a third region and a second region positioned between the fourth region and the first region; the regions being threadless; the first region, the second region and the third region comprising porous or rough outer surfaces and the fourth region comprising a smoother outer surface, wherein the third region is proximate the fourth region; and
c) one or more outward expansions, outward from the longitudinal axis (X-X), of the third region comprising a first slope and a second graduated slope connected to the third region; the second graduated slope inhibiting insertion of the threadless spinal implant beyond a preselected distance, wherein, the third region has a greater girth than the fourth region, the third region and the first region, and on insertion, the first region follows a predetermined surgical route into the surgical field creating a surgical cavity and the second region and third region gradually enlarge surgical cavity.

13. The threadless spinal implant of claim 12, wherein outward dimensions of the third region are greater than the second region and outward dimensions of the first region are less than the outward dimensions of the second region.

14. The threadless spinal implant of claim 13, wherein the second region comprises one or more openings.

15. The threadless spinal implant of claim 14, wherein the first slope is perpendicular to the longitudinal axis (X-X).

16. The threadless spinal implant of claim 15, wherein:
a) the first region expands about the longitudinal axis as the first region approaches the second region; and
b) the fourth region comprises slits.

17. The threadless spinal implant of 16, wherein the fourth region is adapted to receive an insert distinct from the spinal implant.

18. The threadless spinal implant of claim 17, wherein:
a) the first region is round, oblong or oval;
b) relative to the longitudinal axis, the second region is:
  i) round and adapted to expand symmetrically; or
  ii) asymmetrical and adapted to expand in a medial, a lateral, a superior and/or an inferior plane; or
c) the first region and the second region are amorphous.

19. The threadless spinal implant of claim 18, wherein a portion of the first graduated slope and the second graduated slope creates a wing extending from the one or more outward expansions, outward from the longitudinal axis, and the wing is adapted to engage a structure outward of from the surgical route.

20. The threadless spinal implant of claim 19, wherein an outward expansion of an inner wall of the conduit in the third region creates a lock engaging the insert.

* * * * *